United States Patent
Lin

(10) Patent No.: US 10,117,128 B2
(45) Date of Patent: Oct. 30, 2018

(54) SIGNAL TRANSMISSION METHOD AND DEVICE

(71) Applicant: Huawei Technologies Co., Ltd., Shenzhen, Guangdong (CN)

(72) Inventor: Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 14/937,356

(22) Filed: Nov. 10, 2015

(65) Prior Publication Data

US 2016/0066209 A1 Mar. 3, 2016

Related U.S. Application Data

(63) Continuation of application No. PCT/CN2013/075516, filed on May 10, 2013.

(51) Int. Cl.
  *H04W 28/02* (2009.01)
  *H04L 12/801* (2013.01)
  *H04W 48/06* (2009.01)
  *H04W 36/00* (2009.01)

(52) U.S. Cl.
  CPC ... *H04W 28/0289* (2013.01); *H04W 28/0231* (2013.01); *H04W 36/0083* (2013.01); *H04W 48/06* (2013.01)

(58) Field of Classification Search
  CPC ..... H04L 47/12; H04L 47/122; H04L 47/125; H04W 52/0206; H04W 52/143; H04W 52/34; H04W 52/343
  See application file for complete search history.

(56) References Cited

U.S. PATENT DOCUMENTS

| 2007/0248033 | A1 | 10/2007 | Bejerano et al. |
| 2008/0212702 | A1* | 9/2008 | Pan ...................... H04B 7/0417 375/260 |
| 2011/0200014 | A1 | 8/2011 | Lee et al. |
| 2012/0201164 | A1* | 8/2012 | Jongren ................ H04L 5/0048 370/252 |
| 2013/0260815 | A1* | 10/2013 | Wang ................... H04W 52/343 455/522 |

FOREIGN PATENT DOCUMENTS

| CN | 102404784 A | 4/2012 |
| CN | 102647767 A | 8/2012 |
| CN | 102883386 A | 1/2013 |
| WO | WO 2009/099810 A2 | 8/2009 |

OTHER PUBLICATIONS

"Small Cell Discovery for Traffic Offloading", Vodafone, 3GPP TSG RAN WG2 #75, Aug. 22-26, 2011, 3 pages, R2-114009.

* cited by examiner

*Primary Examiner* — Scott M Sciacca

(57) ABSTRACT

The present invention relates to the field of mobile communications technologies, and in particular, to a signal transmission method and device, so as to reduce a burden on a communications network. A signal transmission method provided in an embodiment of the present invention includes: adjusting, by a first communications node, a sending state of a reference signal of a cell that belongs to the first communications node; and sending, by the first communications node, the reference signal of the cell according to an adjusted sending state of the reference signal.

22 Claims, 12 Drawing Sheets

SIGNAL TRANSMISSION METHOD AND DEVICE

CROSS-REFERENCE TO RELATED APPLICATIONS

This application is a continuation of International Application No. PCT/CN2013/075516, filed on May 10, 2013, which is hereby incorporated by reference in its entirety.

TECHNICAL FIELD

The present invention relates to the field of wireless communications technologies, and in particular, to a signal transmission method and device.

BACKGROUND

With the development of mobile communications technologies, a user has increasingly high demands for a network bandwidth. To enhance efficiency of transmitting network data, a low power node (LPN, Low Power Node) may be introduced in a macro cell (macro cell) to form a low power cell, for example, a micro cell (micro cell), a pico cell (pico cell), or a femto cell (femto cell), to enable these low power cells to cover service hotspot areas or areas out of cell coverage. In this way, when a user equipment (User Equipment, UE) moves to these areas, a service of the UE may be handed over to these low power cells, so as to implement service offloading or coverage compensation.

A specific process that UE is handed over to and enters a new cell is generally as follows: The UE receives measurement configuration information of a communications node (that is, a source communications node) of a source cell in which the UE is located, where the measurement configuration information includes measured frequency information. According to the received frequency information, the UE detects a reference signal of a target cell corresponding to the frequency information, and measures the target cell whose reference signal is detected. The UE reports a measurement result to the source communications node, and after determining, according to the measurement result, to perform cell handover, the source communications node initiates a handover request to a communications node (that is, a target communications node) of the detected target cell. The target communications node decides, according to a network condition such as load, interference, and a transmission network bandwidth of the target cell, whether to accept a service of the UE. If the service cannot be accepted, the target communications node sends information about a handover rejection or a handover failure to the source communications node, or if the service can be accepted, the target communications node sends infatuation about a handover agreement or a handover acknowledgment to the source communications node. FIG. 1 is a schematic diagram of UE being handed over between different cells in a heterogeneous network.

In the prior art, when a target cell provides a service, a target communications node of the target cell continuously sends a reference signal. When the target cell turns off the service, a transmitter of the target cell is closed, and the target communications node also no longer sends the reference signal. Because when the target cell provides the service, the reference signal of the target cell is sent continuously, even if load of the target cell is very heavy, UE within a coverage area of the reference signal can also detect the target cell. After completing measurement of the target cell, the UE reports a measurement result to a source communications node. After analyzing the measurement result of the UE and determining to perform cell handover, the source communications node sends a handover request to the target communications node. However, when receiving the handover request, the target communications node may reject the handover request because the load of the target cell is excessively heavy. In this way, a previous process that the UE performs measurement and reporting, a process that the source communications node receives and analyzes the measurement result, and a process of interactions between the source communications node and the target communications node become invalid work. Especially, when the target cell is deployed in a hotspot area, because of a relatively large quantity of UEs, a very large amount of invalid work is caused. FIG. 2 is a schematic diagram of a target cell rejecting access by UE because load of the target cell is excessively heavy.

The foregoing invalid work increases unnecessary signaling overhead between the UE and the source communications node and between the source communications node and the target communications node, and increases a running burden of analyzing the measurement result by the source communications node; moreover, because the source cell cannot perform scheduling for the UE in a measurement process, normal information transmission cannot be performed. The foregoing invalid measurement process severely affects a throughput of the UE.

In addition, in the prior art, once a reference signal starts being sent, a sending state of the reference signal no longer changes.

SUMMARY

Embodiments of the present invention provide a signal transmission method and device, so as to flexibly send a reference signal.

According to a first aspect, a signal transmission method is provided, including: adjusting, by a first communications node, a sending state of a reference signal of a cell that belongs to the first communications node; and sending, by the first communications node, the reference signal of the cell according to an adjusted sending state of the reference signal.

With reference to the first aspect, in a first possible implementation manner, the adjusting, by a first communications node, a sending state of a reference signal of a cell that belongs to the first communications node includes: adjusting, by the first communications node, the sending state of the reference signal to be stopping sending the reference signal of the cell; and the sending, by the first communications node, the reference signal of the cell according to an adjusted sending state of the reference signal includes: stopping, by the first communications node, sending the reference signal of the cell; or the adjusting, by a first communications node, a sending state of a reference signal of a cell that belongs to the first communications node includes: lowering, by the first communications node, a sending power of sending the reference signal of the cell; and the sending, by the first communications node, the reference signal of the cell according to an adjusted sending state of the reference signal includes: sending, by the first communications node, the reference signal by using a lowered sending power; or the adjusting, by a first communications node, a sending state of a reference signal of a cell that belongs to the first communications node includes: extending, by the first communications node, a sending period of sending the reference signal of the cell; and the sending, by the first communications node, the reference signal of the cell according to an adjusted sending state of the reference signal includes: sending, by the first communications node, the reference signal by using a extended sending period; or the adjusting, by a first communications node, a sending state of a reference signal of a cell that belongs to the first communications node includes: lowering, by the first communications node, a bandwidth occupied when the reference signal of the cell is sent; and the sending, by the first communications node, the reference signal of the cell according to an adjusted sending state of the reference signal includes: sending, by the first communications node, the reference signal by using a lowered bandwidth.

With reference to the first aspect, or the first possible implementation manner of the first aspect, in a second possible implementation manner, before the adjusting, by a first communications node, a sending state of a reference signal of a cell that belongs to the first communications node, the method further includes: determining, by the first communications node, that the sending state of the reference signal of the cell needs to be adjusted.

With reference to the second possible implementation manner of the first aspect, in a third possible implementation manner, the determining, by the first communications node, that the sending state of the reference signal of the cell needs to be adjusted includes: when one or more of the following cases occur in the cell, determining, by the first communications node, that the sending state of the reference signal needs to be adjusted: a radio resource is overloaded; a backhaul link network is overloaded; a transmission delay in a backhaul link exceeds a set threshold; or a hardware resource is overloaded.

With reference to the first aspect, or the first to third possible implementation manners of the first aspect, in a fourth possible implementation manner, after the adjusting, by a first communications node, a sending state of a reference signal of a cell that belongs to the first communications node, the method further includes: sending, by the first communications node, indication information to a communications device in the cell, where the indication information is used for indicating at least one of the following indications: an indication that the communications device in the cell determines, according to the adjusted sending state, of the reference signal, indicated by the indication information, whether to measure the reference signal; an indication that the communications device in the cell measures the reference signal according to adjusted measurement configuration information indicated by the indication information; an indication that the communications device in the cell no longer measures the reference signal; or an indication that the communications device in the cell measures a set type of reference signals, where the set type is different from a type of the adjusted reference signal.

With reference to the fourth possible implementation manner of the first aspect, in a fifth possible implementation manner, the sending, by the first communications node, indication information to a communications device in the cell includes at least one of the following: broadcasting, by the first communications node, the indication information to the communications device in the cell by using a system information block SIB; sending the indication information to the communications device in the cell by using dedicated radio resource control RRC signaling; broadcasting the indication information to the communications device in the cell by using a physical layer broadcast message; or sending the indication information to the communications device in the cell by using downlink control information DCI.

With reference to the first aspect, or the first to fifth possible implementation manners of the first aspect, in a sixth possible implementation manner, after the adjusting, by a first communications node, a sending state of a reference signal of a cell that belongs to the first communications node, the method further includes: notifying, by the first communications node, the communications device in the cell to receive data and/or control signaling on a resource carrying the reference signal.

With reference to the sixth possible implementation manner of the first aspect, in a seventh possible implementation manner, the first communications node notifies, according to at least one of the following manners, the communications device in the cell to receive the data and/or control signaling on the resource carrying the reference signal: notifying, by the first communications node by using a system information block SIB, the communications device in the cell to receive the data and/or control signaling on the resource carrying the reference signal; notifying, by the first communications node by using dedicated radio resource control RRC signaling, the communications device in the cell to receive the data and/or control signaling on the resource carrying the reference signal; notifying, by the first communications node by using a physical layer broadcast message, the communications device in the cell to receive the data and/or control signaling on the resource carrying the reference signal; or notifying, by the first communications node by using downlink control information DCI, the communications device in the cell to receive the data and/or control signaling on the resource carrying the reference signal.

With reference to the sixth or seventh possible implementation manner of the first aspect, in an eighth possible implementation manner, after the first communications node notifies the communications device in the cell to receive the control signaling on the resource carrying the reference signal, the first communications node sends, by using a physical layer control channel, the control signaling on the resource carrying the reference signal to the communications device in the cell; and/or, after the first communications node notifies the communications device in the cell to receive the data on the resource occupied when the reference signal is carried, the first communications node sends, by using a physical layer data channel, the data on the resource carrying the reference signal to the communications device in the cell.

With reference to the first aspect, or the first to eighth possible implementation manners of the first aspect, in a ninth possible implementation manner, after the adjusting, by a first communications node, a sending state of a reference signal of a cell, the method further includes: notifying, by the first communications node, a communications node of a neighboring cell of the adjusted sending state of the reference signal of the cell, to enable the communications node of the neighboring cell to determine, according to the adjusted sending state of the reference signal of the cell, whether UE in the neighboring cell needs to measure the cell, and/or, determine configuration information for measuring the cell by UE in the neighboring cell.

With reference to the first aspect, or the first to ninth possible implementation manners of the first aspect, in a tenth possible implementation manner, after the adjusting, by a first communications node, a sending state of a reference signal of a cell that belongs to the first communications node, the method further includes: after the first communications node determines that the reference signal needs to be sent, sending, by the first communications node, the reference signal including load information of the cell.

With reference to the tenth possible implementation manner of the first aspect, in an eleventh possible implementation manner, the sending, by the first communications node, the reference signal including load information of the cell includes at least one of the following: sending, by the first communications node, the reference signal according to a reference signal sending period corresponding to the load information; sending, by the first communications node, the reference signal including encoding information corresponding to the load information; or sending, by the first communications node, the reference signal by using a bandwidth corresponding to the load information.

With reference to the first aspect, or the first to eleventh possible implementation manners of the first aspect, in a twelfth possible implementation manner, the adjusting, by a first communications node, a sending state of a reference signal of a cell that belongs to the first communications node includes: adjusting, by the first communications node, the sending state of the reference signal of the cell by using a communications device managed by the first communications node; or adjusting, by a physical layer of the first communications node, the sending state of the reference signal according to an adjustment manner indicated by a radio resource control RRC layer of the first communications node.

With reference to the first aspect, or the first to twelfth possible implementation manners of the first aspect, in a thirteenth possible implementation manner, after the adjusting, by a first communications node, a sending state of a reference signal of a cell that belongs to the first communications node, the method further includes: after the first communications node determines that the sending state of the reference signal needs to be restored, restoring the sending state of the reference signal, and sending the reference signal by using a restored sending state.

With reference to the first aspect, or the first to thirteenth possible implementation manners of the first aspect, in a fourteenth possible implementation manner, the reference signal is at least one of the following types of reference signals: a synchronization signal; a discovery reference signal Discovery RS; a channel state information reference signal CSI-RS;

a cell-specific reference signal CRS; a common demodulation reference signal DM-RS; or a cell-common reference signal.

According to a second aspect, a signal transmission method is provided, including: receiving, by a communications device, an adjusted reference signal, of a cell in which the communications device is located, sent by a first communications node; and performing, by the communications device, communication according to the adjusted reference signal, where the reference signal is: the reference signal sent by the first communications node according to an adjusted sending state of the reference signal.

With reference to the second aspect, in a first possible implementation manner, before the receiving, by a communications device, an adjusted reference signal, of a cell in which the communications device is located, sent by a first communications node, the method further includes: receiving, by the communications device, indication information sent by the first communications node, where the indication information is used for indicating the sending state, of the reference signal, adjusted by the first communications node; and adjusting, by the communications device, measurement of the reference signal according to the adjusted sending state of the reference signal.

With reference to the first possible implementation manner of the second aspect, in a second possible implementation manner, the adjusting, by the communications device, measurement of the reference signal according to the adjusted sending state, of the reference signal, indicated by the indication information includes at least one of the following:

determining, by the communications device according to the adjusted sending state, of the reference signal, indicated by the indication information, whether to measure the reference signal; measuring, by the communications device, the reference signal according to adjusted measurement configuration information indicated by the indication information; no longer measuring, by the communications device, the reference signal according to an indication, of no longer measuring the reference signal, in the indication information; and measuring, by the communications device, a first type of reference signals according to an indication, of measuring the first type of reference signals, in the indication information, where the first type is different from a type of the adjusted reference signal.

With reference to the first or second possible implementation manner of the second aspect, in a third possible implementation manner, the receiving, by the communications device, indication information sent by the first communications node includes at least one of the following: receiving, by the communications device by using a system information block SIB, the indication information sent by a communications node of the cell in which the communications device is located; receiving, by using dedicated radio resource control RRC signaling, the indication information sent by a communications node of the cell in which the communications device is located; receiving, by using a physical layer broadcast message, the indication information sent by a communications node of the cell in which the communications device is located; or receiving, by using downlink control information DCI, the indication information sent by a communications node of the cell in which the communications device is located.

According to a third aspect, a signal transmission method is provided, including: receiving, by a communications device, notification information sent by a first communications node, where the notification information is sent by the first communications node after the first communications node adjusts a sending state of a reference signal of a cell in which the communications device is located; and receiving, by the communications device according to the notification information, data and/or control signaling on a resource carrying the reference signal.

With reference to the third aspect, in a first possible implementation manner, the receiving, by the communications device, data and/or control signaling on a resource carrying the reference signal includes: receiving, by the communications device by using a physical layer control channel, the control signaling on the resource carrying the reference signal; and/or, receiving, by using a physical layer data channel, the data on the resource carrying the reference signal.

With reference to the third aspect, in a second possible implementation manner, the receiving, by a communications device, notification information sent by a first communications node includes at least one of the following: receiving, by the communications device by using a system information block SIB, the notification information sent by the first communications node; receiving, by using dedicated radio resource control RRC signaling, the notification information sent by the first communications node; receiving, by using a physical layer broadcast message, the notification information sent by the first communications node; or receiving, by using downlink control information DCI, the notification information sent by the first communications node.

According to a fourth aspect, a signal transmission method is provided, including: receiving, by a first communications node, an adjusted sending state, of a reference signal of a neighboring cell, sent by a communications node of the neighboring cell; and controlling, by the first communications node according to the received adjusted sending state of the reference signal of the neighboring cell, measurement of a cell of user equipment UE served by the first communications node.

With reference to the fourth aspect, in a first possible implementation manner, the controlling, by the first communications node according to the received adjusted sending state of the reference signal of the neighboring cell, measurement of a cell of user equipment UE served by the first communications node includes: determining, by the first communications node according to the received adjusted sending state of the reference signal of the neighboring cell, whether the UE served by the first communications node needs to measure the neighboring cell, and/or, determining configuration information for measuring the neighboring cell by UE served by the first communications node.

According to a fifth aspect, a signal transmission method is provided, including: generating, by a first communications node, a reference signal, where the reference signal carries load information of a cell in which the first communications node is located; and sending, by the first communications node, the reference signal, where the reference signal is used for enabling a communications device that detects the reference signal to determine, according to the load information, whether to measure the cell, or determine whether to report a measurement result of measuring the cell, or determine whether to access the cell.

With reference to the fifth aspect, in a first possible implementation manner, the sending, by the first communications node, the reference signal includes at least one of the following: sending, by the first communications node, the reference signal according to a reference signal sending period corresponding to the load information; sending, by the first communications node, the reference signal including encoding information corresponding to the load information; or sending, by the first communications node, the reference signal by using a bandwidth corresponding to the load information.

According to a sixth aspect, a signal transmission method is provided, where the method includes: receiving, by a communications device, a reference signal sent by a first communications node, where the reference signal carries load information of a cell in which the first communications node is located; and determining, by the communications device according to the load information, whether to measure the cell, or determining whether to report a measurement result of measuring the cell, or determining whether to access the cell.

With reference to the sixth aspect, in a first possible implementation manner, before the determining, by the communications device according to the load information, whether to measure the cell, or determining whether to report a measurement result of measuring the cell, or determining whether to access the cell, the method further includes at least one of the following: determining, by the communications device according to a reference signal sending period of sending the reference signal by the first communications node, the load information included in the reference signal; determining the load information according to encoding information included in the reference signal; or determining the load information according to a bandwidth occupied when the first communications node sends the reference signal.

According to a seventh aspect, a signal transmission device is provided, including: an adjustment module, configured to adjust a sending state of a reference signal of a cell that belongs to a first communications node in which the adjustment module is located, and transmit an adjusted sending state of the reference signal to a sending module; and the sending module, configured to receive the sending state, of the reference signal, adjusted by the adjustment module, and send the reference signal of the cell according to the adjusted sending state of the reference signal.

With reference to the seventh aspect, in a first possible implementation manner, the adjustment module is specifically configured to: adjust the sending state of the reference signal to be stopping sending the reference signal of the cell; and the sending module is specifically configured to: stop sending the reference signal of the cell; or the adjustment module is specifically configured to: lower a sending power of sending the reference signal of the cell; and the sending module is specifically configured to: send the reference signal by using the lowered sending power; or the adjustment module is specifically configured to: extend a sending period of sending the reference signal of the cell; and the sending module is specifically configured to: send the reference signal by using the extended sending period; or the adjustment module is specifically configured to: lower a bandwidth occupied when the reference signal of the cell is sent; and the sending module is specifically configured to: send the reference signal by using the lowered bandwidth.

With reference to the seventh aspect, or the first possible implementation manner of the seventh aspect, in a second possible implementation manner, the device further includes: a determining module, configured to: before the adjustment module adjusts the sending state of the reference signal, determine that the sending state of the reference signal of the cell needs to be adjusted.

With reference to the second possible implementation manner of the seventh aspect, in a third possible implementation manner, the determining module is specifically configured to: when one or more of the following cases occur in the cell, determine that the sending state of the reference signal needs to be adjusted: a radio resource is overloaded; a backhaul link network is overloaded; a transmission delay in a backhaul link exceeds a set threshold; or a hardware resource is overloaded.

With reference to the seventh aspect, or the first to third possible implementation manners of the seventh aspect, in a fourth possible implementation manner, the sending module is further configured to: after the adjustment module adjusts the sending state of the reference signal of the cell, send indication information to a communications device in the cell, where the indication information is used for indicating at least one of the following indications: an indication that the communications device in the cell determines, according to the adjusted sending state, of the reference signal, indicated by the indication information, whether to measure the reference signal; an indication that the communications device in the cell measures the reference signal according to adjusted measurement configuration information indicated by the indication information; an indication that the communications device in the cell no longer measures the reference signal; or an indication that the communications device in the cell measures a set type of reference signals, where the set type is different from a type of the adjusted reference signal.

With reference to the fourth possible implementation manner of the seventh aspect, in a fifth possible implementation manner, the sending module is specifically configured to send the indication information according to at least one of the following: broadcasting the indication information to the communications device in the cell by using a system information block SIB; sending the indication information to the communications device in the cell by using dedicated radio resource control RRC signaling; broadcasting the indication information to the communications device in the cell by using a physical layer broadcast message; or sending the indication information to the communications device in the cell by using downlink control information DCI.

With reference to the seventh aspect, or the first to fifth possible implementation manners of the seventh aspect, in a sixth possible implementation manner, the sending module is further configured to: after the adjustment module adjusts the sending state of the reference signal of the cell, notify the communications device in the cell to receive data and/or control signaling on a resource carrying the reference signal.

With reference to the sixth possible implementation manner of the seventh aspect, in a seventh possible implementation manner, the sending module is specifically configured to notify, according to at least one of the following manners, the communications device in the cell to receive the data and/or control signaling on the resource carrying the reference signal: notifying, by using a system information block SIB, the communications device in the cell to receive the data and/or control signaling on the resource carrying the reference signal; notifying, by using dedicated radio resource control RRC signaling, the communications device in the cell to receive the data and/or control signaling on the resource carrying the reference signal; notifying, by using a physical layer broadcast message, the communications device in the cell to receive the data and/or control signaling on the resource carrying the reference signal; or notifying, by using downlink control information DCI, the communications device in the cell to receive the data and/or control signaling on the resource carrying the reference signal.

With reference to the sixth or seventh possible implementation manner of the seventh aspect, in an eighth possible implementation manner, the sending module is specifically configured to: after the communications device in the cell is notified to receive the control signaling on the resource carrying the reference signal, send, by using a physical layer control channel, the control signaling on the resource carrying the reference signal to the communications device in the cell; and/or after the communications device in the cell is notified to receive the data on the resource occupied when the reference signal is carried, send, by using a physical layer data channel, the data on the resource carrying the reference signal to the communications device in the cell.

With reference to the seventh aspect, or the first to eighth possible implementation manners of the seventh aspect, in a ninth possible implementation manner, the sending module is further configured to: after the adjustment module adjusts the sending state of the reference signal of the cell, notify a communications node of a neighboring cell of the adjusted sending state of the reference signal of the cell, to enable the communications node of the neighboring cell to determine, according to the adjusted sending state of the reference signal of the cell, whether UE in the neighboring cell needs to measure the cell, and/or, determine configuration information for measuring the cell by UE in the neighboring cell.

With reference to the seventh aspect, or the first to ninth possible implementation manners of the seventh aspect, in a tenth possible implementation manner, the sending module is further configured to: after the adjustment module adjusts the sending state of the reference signal of the cell that belongs to the first communications node, send the reference signal including load information of the cell.

With reference to the tenth possible implementation manner of the seventh aspect, in an eleventh possible implementation manner, the sending module is specifically configured to send the reference signal according to at least one of the following: sending the reference signal according to a reference signal sending period corresponding to the load information; sending the reference signal including encoding information corresponding to the load information; or sending the reference signal by using a bandwidth corresponding to the load information.

With reference to the seventh aspect, or the first to eleventh possible implementation manners of the seventh aspect, in a twelfth possible implementation manner, the adjustment module is specifically configured to: adjust the sending state of the reference signal of the cell by using a communications device managed by the first communications node; or adjust the sending state of the reference signal according to an adjustment manner indicated by a radio resource control RRC layer of the first communications node.

With reference to the seventh aspect, or the first to twelfth possible implementation manners of the seventh aspect, in a thirteenth possible implementation manner, the adjustment module is further configured to: after it is determined that the sending state of the reference signal needs to be restored, restore the sending state of the reference signal; and the sending module is further configured to: send the reference signal by using a restored sending state.

With reference to the seventh aspect, or the first to thirteenth possible implementation manners of the seventh aspect, in a fourteenth possible implementation manner, the reference signal is at least one of the following types of reference signals: a synchronization signal; a discovery reference signal Discovery RS; a channel state information reference signal CSI-RS; a cell-specific reference signal CRS; a common demodulation reference signal DM-RS; or a cell-common reference signal.

According to an eighth aspect, a communications device for performing signal transmission is provided, including: a receiving module, configured to receive an adjusted reference signal, of a cell in which the communications device is located, sent by a first communications node, and transmit the adjusted reference signal to a communications module; and the communications module, configured to receive the adjusted reference signal, of the cell, transmitted by the receiving module, and perform communication according to the adjusted reference signal, where the reference signal is: the reference signal sent by the first communications node according to an adjusted sending state of the reference signal.

With reference to the eighth aspect, in a first possible implementation manner, the receiving module is further configured to: receive indication information sent by the first communications node, where the indication information is used for indicating the sending state, of the reference signal, adjusted by the first communications node; and the communications device further includes: a measurement adjustment module, configured to adjust measurement of the reference signal according to the adjusted sending state of the reference signal.

With reference to the first possible implementation manner of the eighth aspect, in a second possible implementation manner, the measurement adjustment module is specifically configured to: determine, according to the adjusted sending state, of the reference signal, indicated by the indication information, whether to measure the reference signal; measure the reference signal according to adjusted measurement configuration information indicated by the indication information; no longer measure the reference signal according to an indication, of no longer measuring the reference signal, in the indication information; and measure a first type of reference signals according to an indication, of measuring the first type of reference signals, in the indication information, where the first type is different from a type of the adjusted reference signal.

With reference to the first or second possible implementation manner of the eighth aspect, in a third possible implementation manner, the receiving module is specifically configured to: receive, by using a system information block SIB, the indication information sent by a communications node of the cell in which the communications device is located; receive, by using dedicated radio resource control RRC signaling, the indication information sent by a communications node of the cell in which the communications device is located; receive, by using a physical layer broadcast message, the indication information sent by a communications node of the cell in which the communications device is located; or receive, by using downlink control information DCI, the indication information sent by a communications node of the cell in which the communications device is located.

According to a ninth aspect, a communications device for performing signal transmission is provided, including: a first receiving module, configured to receive notification information sent by a first communications node, and transmit the received notification information to a second receiving module, where the notification information is sent by the first communications node after the first communications node adjusts a sending state of a reference signal of a cell in which the communications device is located; and the second receiving module, configured to receive the notification information transmitted by the first receiving module, and receive, according to the notification information, data and/or control signaling on a resource carrying the reference signal.

With reference to the ninth aspect, in a first possible implementation manner, the second receiving module is specifically configured to: receive, by using a physical layer control channel, the control signaling on the resource carrying the reference signal; and/or, receive, by using a physical layer data channel, the data on the resource carrying the reference signal.

With reference to the ninth aspect, or the first possible implementation manner of the ninth aspect, in a second possible implementation manner, the first receiving module is specifically configured to receive, in at least one of the following manners, the notification information sent by the first communications node: receiving, by using a system information block SIB, the notification information sent by the first communications node; receiving, by using dedicated radio resource control RRC signaling, the notification information sent by the first communications node; receiving, by using a physical layer broadcast message, the notification information sent by the first communications node; or receiving, by using downlink control information DCI, the notification information sent by the first communications node.

According to a tenth aspect, a signal transmission device is provided, including: a receiving module, configured to receive an adjusted sending state, of a reference signal of a neighboring cell, sent by a communications node of the neighboring cell, and transmit the received adjusted sending state of the reference signal of the neighboring cell to a control module; and the control module, configured to control, according to the adjusted sending state, of the reference signal of the neighboring cell, transmitted by the receiving module, measurement of a cell of user equipment UE served by the device.

With reference to the tenth aspect, in a first possible implementation manner, the control module is specifically configured to: determine, according to the adjusted sending state, of the reference signal of the neighboring cell, received by the receiving module, whether the UE served by the device needs to measure the neighboring cell, and/or, determine configuration information for measuring the neighboring cell by the UE served by the device.

According to an eleventh aspect, a signal transmission device is provided, including: a generation module, configured to generate a reference signal of a cell in which a first communications node is located, and transmit the generated reference signal to a sending module, where the reference signal carries load information of the cell in which the first communications node is located; and the sending module, configured to receive the reference signal generated by the generation module, and send the reference signal, where the reference signal is used for enabling a communications device that detects the reference signal to determine, according to the load information, whether to measure the cell, or determine whether to report a measurement result of measuring the cell, or determine whether to access the cell.

With reference to the eleventh aspect, in a first possible implementation manner, the sending module is specifically configured to send the reference signal according to at least one of the following:

sending the reference signal according to a reference signal sending period corresponding to the load information; sending the reference signal including encoding information corresponding to the load information; or sending the reference signal by using a bandwidth corresponding to the load information.

According to a twelfth aspect, a communications device for performing signal transmission is provided, where the communications device includes: a receiving module, configured to receive a reference signal sent by a first communications node, where the reference signal carries load information of a cell in which the first communications node is located, and transmit the received reference signal to a judging module; and the judging module, configured to receive the reference signal received by the receiving module, and determine, according to the load information, whether to measure the cell, or determine whether to report a measurement result of measuring the cell, or determine whether to access the cell.

With reference to the twelfth aspect, in a first possible implementation manner, the judging module is specifically configured to determine the load information according to at least one of the following:

determining, according to a reference signal sending period, of the reference signal, sent by the first communications node, the load information included in the reference signal;

determining the load information according to encoding information included in the reference signal; or determining the load information according to a bandwidth occupied when the first communications node sends the reference signal.

By means of the embodiments of the present invention, a first communications node can adjust a sending state of a reference signal of a cell that belongs to the first communications node, and send the reference signal according to an adjusted sending state, so that the reference signal can be flexibly sent, thereby enhancing flexibility of a system.

By means of the embodiments of the present invention, after a first communications node adjusts a sending state of a reference signal of a cell in which a communications device is located, the communications device can use resource reception information released from the reference signal after the sending state is adjusted, so that network resources can be fully used, thereby increasing network utilization.

By means of the embodiments of the present invention, after a communications node of a neighboring cell sends an adjusted sending state of a reference signal of the neighboring cell, a first communications node can control, according to the adjusted sending state, measurement of a cell of user equipment UE served by the first communications node, thereby increasing measurement efficiency of the UE.

By means of the embodiments of the present invention, a first communications node adds load information to a reference signal, so that a communications device that receives the reference signal can perform a corresponding operation according to the load information, thereby preventing the communications device from accessing a cell with high load.

DETAILED DESCRIPTION

Figure 1:
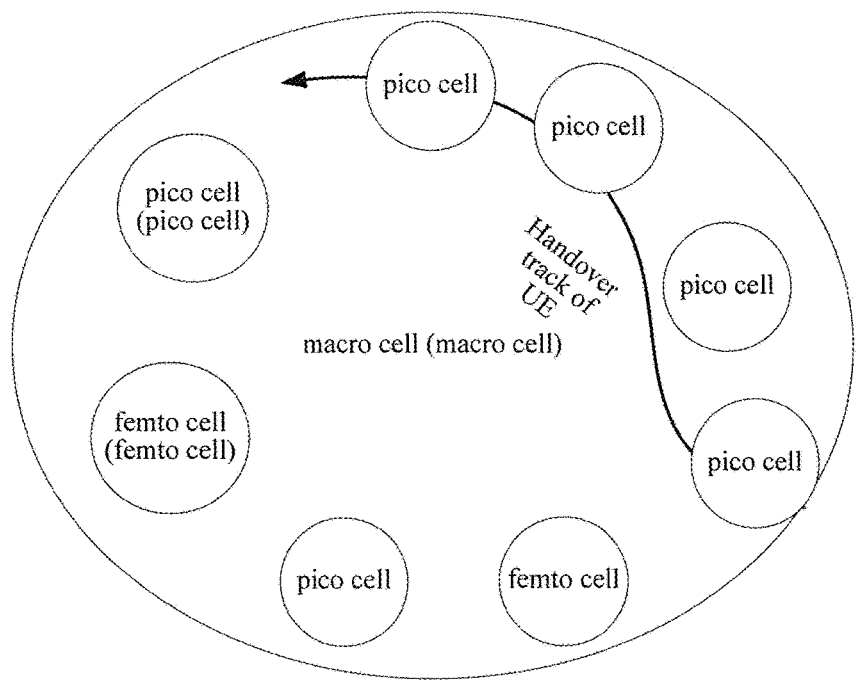
FIG. 1 is a schematic diagram of UE being handed over between different cells in a heterogeneous network.
Figure 2:
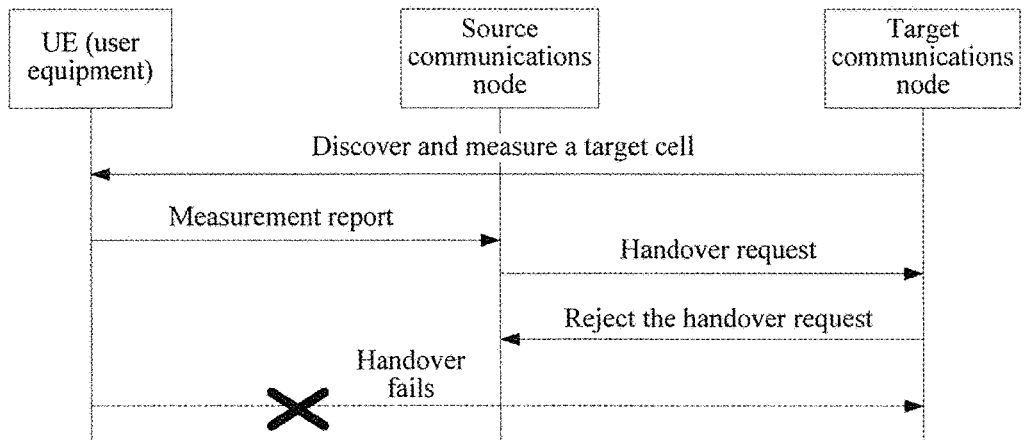
FIG. 2 is a schematic diagram of a target cell rejecting access by UE because load of the target cell is excessively heavy.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention. For embodiments below, reference may be made to each other without any contradiction.

The technical solutions described in the embodiments of the present invention may be applied to various communications systems, such as current 2G and 3G communications systems and a next-generation communications system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access) system, a Frequency Division Multiple Access (FDMA, Frequency Division Multiple Access) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and other similar communications systems.

In the embodiments of the present invention, various aspects of the technical solutions are described from the perspective of user equipment and/or a base station.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile device, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be an evolved NodeB (NodeB, eNB, or e-NodeB, evolved Node B) in LTE, or may be a base transceiver station (BTS, Base Transceiver Station) in GSM or CDMA, or may be a NodeB (NodeB) in WCDMA, which is not limited in the this application.

A base station processor may be a base station controller (BSC, base station controller) in GSM or CDMA, or a radio network controller (RNC, Radio Network Controller) in WCDMA, which is not limited in this application.

In addition, the terms "system" and "network" may be used interchangeably in the embodiments of the present invention. The term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in the embodiments of the present invention generally indicates an "or" relationship between associated objects.

Figure 3:
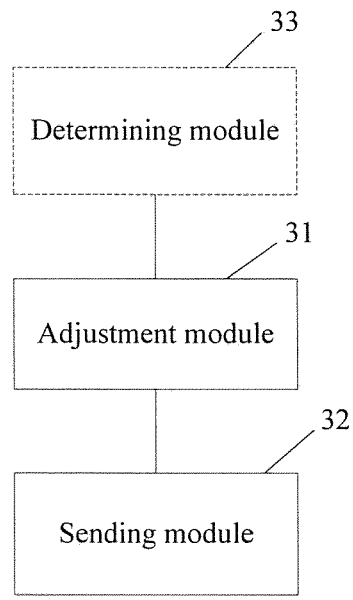
FIG. 3 is a schematic structural diagram of a signal transmission device according to Embodiment 1 of the present invention.

FIG. 3 is a schematic structural diagram of a signal transmission device according to Embodiment 1 of the present invention, where the signal transmission device includes:

an adjustment module 31, configured to adjust a sending state of a reference signal of a cell that belongs to a first communications node in which the adjustment module 31 is located, and transmit an adjusted sending state of the reference signal to a sending module 32; and the sending module 32, configured to receive the sending state, of the reference signal, adjusted by the adjustment module 31, and send the reference signal of the cell according to the adjusted sending state of the reference signal.

Preferably, the adjustment module 31 is specifically configured to: adjust the sending state of the reference signal to be stopping sending the reference signal of the cell; and the sending module 32 is specifically configured to: stop sending the reference signal of the cell; or, the adjustment module 31 is specifically configured to: lower a sending power of sending the reference signal of the cell; and the sending module 32 is specifically configured to: send the reference signal by using the lowered sending power; or, the adjustment module 31 is specifically configured to: extend a sending period of sending the reference signal of the cell; and the sending module 32 is specifically configured to: send the reference signal by using the extended sending period; or the adjustment module 31 is specifically configured to: lower a bandwidth occupied when the reference signal of the cell is sent; and the sending module 32 is specifically configured to: send the reference signal by using the lowered bandwidth.

Preferably, the device further includes:

a determining module 33, configured to: before the adjustment module 31 adjusts the sending state of the reference signal, determine that the sending state of the reference signal of the cell needs to be adjusted.

Preferably, the determining module 33 is specifically configured to:

when one or more of the following cases occur in the cell, determine that the sending state of the reference signal needs to be adjusted:

a radio resource is overloaded;

a backhaul link network is overloaded;

a transmission delay in a backhaul link exceeds a set threshold; or a hardware resource is overloaded.

Preferably, the sending module 32 is further configured to:

after the adjustment module 31 adjusts the sending state of the reference signal of the cell, send indication information to a communications device in the cell, where the indication information is used for indicating at least one of the following indications:

an indication that the communications device in the cell determines, according to the adjusted sending state, of the reference signal, indicated by the indication information, whether to measure the reference signal;

an indication that the communications device in the cell measures the reference signal according to adjusted measurement configuration information indicated by the indication information;

an indication that the communications device in the cell no longer measures the reference signal; or an indication that the communications device in the cell measures a set type of reference signals, where the set type is different from a type of the adjusted reference signal.

Preferably, the sending module 32 is specifically configured to send the indication information according to at least one of the following:

broadcasting the indication information to the communications device in the cell by using a system information block SIB; sending the indication information to the communications device in the cell by using dedicated radio resource control RRC signaling; broadcasting the indication information to the communications device in the cell by using a physical layer broadcast message; or sending the indication information to the communications device in the cell by using downlink control information DCI.

Preferably, the sending module 32 is further configured to:

after the adjustment module 31 adjusts the sending state of the reference signal of the cell, notify the communications device in the cell to receive data and/or control signaling on a resource carrying the reference signal.

Preferably, the sending module 32 is specifically configured to notify, according to at least one of the following manners, the communications device in the cell to receive the data and/or control signaling on the resource carrying the reference signal:

notifying, by using a system information block SIB, the communications device in the cell to receive the data and/or control signaling on the resource carrying the reference signal;

notifying, by using dedicated radio resource control RRC signaling, the communications device in the cell to receive the data and/or control signaling on the resource carrying the reference signal;

notifying, by using a physical layer broadcast message, the communications device in the cell to receive the data and/or control signaling on the resource carrying the reference signal; or notifying, by using downlink control information DCI, the communications device in the cell to receive the data and/or control signaling on the resource carrying the reference signal.

Preferably, the sending module 32 is specifically configured to:

after the communications device in the cell is notified to receive the control signaling on the resource carrying the reference signal, send, by using a physical layer control channel, the control signaling on the resource carrying the reference signal to the communications device in the cell; and/or after the communications device in the cell is notified to receive the data on the resource occupied when the reference signal is carried, send, by using a physical layer data channel, the data on the resource carrying the reference signal to the communications device in the cell.

Preferably, the sending module 32 is further configured to: after the adjustment module 31 adjusts the sending state of the reference signal of the cell, notify a communications node of a neighboring cell of the adjusted sending state of the reference signal of the cell, to enable the communications node of the neighboring cell to determine, according to the adjusted sending state of the reference signal of the cell, whether UE in the neighboring cell needs to measure the cell, and/or, determine configuration information for measuring the cell by UE in the neighboring cell.

Preferably, the sending module 32 is further configured to: after the adjustment module 31 adjusts the sending state of the reference signal of the cell that belongs to the first communications node, send the reference signal including load information of the cell.

Preferably, the sending module 32 is specifically configured to:

send the reference signal according to a reference signal sending period corresponding to the load information;

send the reference signal including encoding information corresponding to the load information; or send the reference signal by using a bandwidth corresponding to the load information.

Preferably, the adjustment module 31 is specifically configured to:

adjust the sending state of the reference signal of the cell by using a communications device managed by the first communications node; or adjust the sending state of the reference signal according to an adjustment manner indicated by a radio resource control RRC layer of the first communications node.

Preferably, the adjustment module 31 is further configured to:

after it is determined that the sending state of the reference signal needs to be restored, restore the sending state of the reference signal; and the sending module 32 is further configured to: send the reference signal by using a restored sending state.

Preferably, the reference signal is at least one of the following types of reference signals:

a synchronization signal;

a discovery reference signal Discovery RS;

a channel state information reference signal CSI-RS;

a cell-specific reference signal CRS;

a common demodulation reference signal DM-RS; or a cell-common reference signal.

Figure 4:
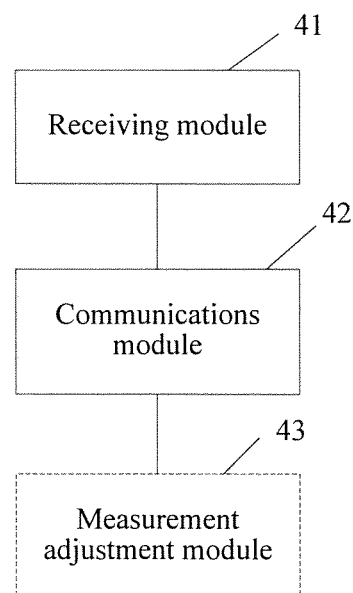
FIG. 4 is a schematic structural diagram of a communications device for performing signal transmission according to Embodiment 2 of the present invention.

FIG. 4 is a schematic structural diagram of a communications device for performing signal transmission according to Embodiment 2 of the present invention, where the communications device includes:

a receiving module 41, configured to receive an adjusted reference signal, of a cell in which the communications device is located, sent by a first communications node, and transmit the adjusted reference signal to a communications module 42; and the communications module 42, configured to receive the adjusted reference signal, of the cell, transmitted by the receiving module 41, and perform communication according to the adjusted reference signal, where the reference signal is: the reference signal sent by the first communications node according to an adjusted sending state of the reference signal.

Preferably, the receiving module 41 is further configured to:

receive indication information sent by the first communications node, where the indication information is used for indicating the sending state, of the reference signal, adjusted by the first communications node; and the communications device further includes:

a measurement adjustment module 43, configured to adjust measurement of the reference signal according to the adjusted sending state of the reference signal.

Preferably, the measurement adjustment module 43 is specifically configured to:

determine, according to the adjusted sending state, of the reference signal, indicated by the indication information, whether to measure the reference signal;

measure the reference signal according to adjusted measurement configuration information indicated by the indication information;

no longer measure the reference signal according to an indication, of no longer measuring the reference signal, in the indication information; or measure a first type of reference signals according to an indication, of measuring the first type of reference signals, in the indication information, where the first type is different from a type of the adjusted reference signal.

Preferably, the receiving module 41 is specifically configured to:

receive, by using a system information block SIB, the indication information sent by a communications node of the cell in which the communications device is located; receive, by using dedicated radio resource control RRC signaling, the indication information sent by a communications node of the cell in which the communications device is located; receive, by using a physical layer broadcast message, the indication information sent by a communications node of the cell in which the communications device is located; or receive, by using downlink control information DCI, the indication information sent by a communications node of the cell in which the communications device is located.

Figure 5:
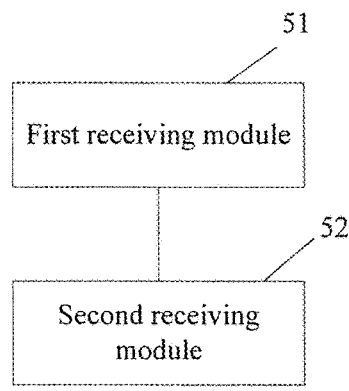
FIG. 5 is a schematic structural diagram of a communications device for performing signal transmission according to Embodiment 3 of the present invention.

FIG. 5 is a schematic structural diagram of a communications device for performing signal transmission according to Embodiment 3 of the present invention, where the communications device includes:

a first receiving module 51, configured to receive notification information sent by a first communications node, and transmit the received notification information to a second receiving module 52, where the notification information is sent by the first communications node after the first communications node adjusts a sending state of a reference signal of a cell in which the communications device is located; and the second receiving module 52, configured to receive the notification information received by the first receiving module 51, and receive, according to the notification information, data and/or control signaling on a resource carrying the reference signal.

Preferably, the second receiving module 52 is specifically configured to:

receive, by using a physical layer control channel, the control signaling on the resource carrying the reference signal; and/or, receive, by using a physical layer data channel, the data on the resource carrying the reference signal.

Preferably, the first receiving module 51 is specifically configured to: receive, in at least one of the following manners, the notification information sent by the first communications node:

receiving, by using a system information block SIB, the notification information sent by the first communications node; receiving, by using dedicated radio resource control RRC signaling, the notification information sent by the first communications node; receiving, by using a physical layer broadcast message, the notification information sent by the first communications node; or receiving, by using downlink control information DCI, the notification information sent by the first communications node.

Figure 6:
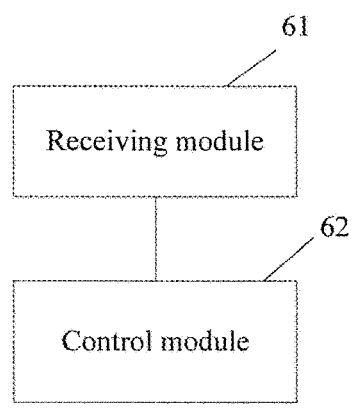
FIG. 6 is a schematic structural diagram of a signal transmission device according to Embodiment 4 of the present invention.

FIG. 6 is a schematic structural diagram of a signal transmission device according to Embodiment 4 of the present invention, where the signal transmission device includes:

a receiving module 61, configured to receive an adjusted sending state, of a reference signal of a neighboring cell, sent by a communications node of the neighboring cell, and transmit the received adjusted sending state of the reference signal of the neighboring cell to a control module 62; and the control module 62, configured to control, according to the adjusted sending state, of the reference signal of the neighboring cell, received by the receiving module 61, measurement of a cell of user equipment UE served by the device.

Preferably, the control module 62 is specifically configured to:

determine, according to the adjusted sending state, of the reference signal of the neighboring cell, received by the receiving module 61, whether the UE served by the device needs to measure the neighboring cell, and/or, determine configuration information for measuring the neighboring cell by the UE served by the device.

Figure 7:
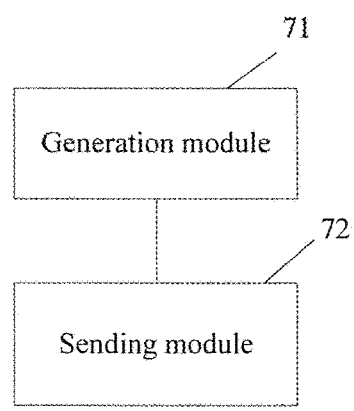
FIG. 7 is a schematic structural diagram of a signal transmission device according to Embodiment 5 of the present invention.

FIG. 7 is a schematic structural diagram of a signal transmission device according to Embodiment 5 of the present invention, where the signal transmission device includes:

a generation module 71, configured to generate a reference signal of a cell in which a first communications node is located, and transmit the generated reference signal to a sending module 72, where the reference signal carries load information of the cell in which the first communications node is located; and the sending module 72, configured to receive the reference signal generated by the generation module 71, and send the reference signal, where the reference signal is used for enabling a communications device that detects the reference signal to determine, according to the load information, whether to measure the cell, or determine whether to report a measurement result of measuring the cell, or determine whether to access the cell.

Preferably, the sending module 72 is specifically configured to send the reference signal according to at least one of the following:

sending the reference signal according to a reference signal sending period corresponding to the load information;

sending the reference signal including encoding information corresponding to the load information; or sending the reference signal by using a bandwidth corresponding to the load information.

Figure 8:
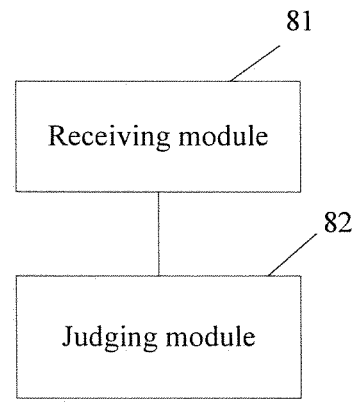
FIG. 8 is a schematic structural diagram of a communications device for performing signal transmission according to Embodiment 6 of the present invention.

FIG. 8 is a schematic structural diagram of a communications device for performing signal transmission according to Embodiment 6 of the present invention, where the communications device includes:

a receiving module 81, configured to receive a reference signal sent by a first communications node, where the reference signal carries load information of a cell in which the first communications node is located, and transmit the received reference signal to a judging module 82; and the judging module 82, configured to receive the reference signal received by the receiving module 81, and determine, according to the load information, whether to measure the cell, or determine whether to report a measurement result of measuring the cell, or determine whether to access the cell.

Preferably, the judging module 82 is specifically configured to determine the load information according to at least one of the following:

determining, according to a reference signal sending period of sending the reference signal by the first communications node, the load information included in the reference signal;

determining the load information according to encoding information included in the reference signal; or determining the load information according to a bandwidth occupied when the first communications node sends the reference signal.

Figure 9:
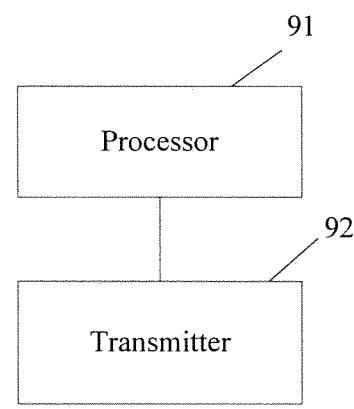
FIG. 9 is a structural diagram of a signal transmission device according to Embodiment 7 of the present invention.

FIG. 9 is a structural diagram of a signal transmission device according to Embodiment 7 of the present invention, where the signal transmission device includes:

a processor 91, configured to adjust a sending state of a reference signal of a cell that belongs to a first communications node in which the processor 91 is located, and transmit the adjusted sending state of the reference signal to a transmitter 92; and the transmitter 92, configured to receive the sending state, of the reference signal, adjusted by the processor 91, and send the reference signal of the cell according to the adjusted sending state of the reference signal.

Preferably, the processor 91 is specifically configured to: adjust the sending state of the reference signal to be stopping sending the reference signal of the cell; and the transmitter 92 is specifically configured to: stop sending the reference signal of the cell; or the processor 91 is specifically configured to: lower a sending power of sending the reference signal of the cell; and the transmitter 102 is specifically configured to: send the reference signal by using the lowered sending power; or the processor 91 is specifically configured to: extend a sending period of sending the reference signal of the cell; and the transmitter 102 is specifically configured to: send the reference signal by using the extended sending period; or the processor 91 is specifically configured to: lower a bandwidth occupied when the reference signal of the cell is sent; and the transmitter 92 is specifically configured to: send the reference signal by using the lowered bandwidth.

Preferably, the processor 91 is further configured to: before the sending state of the reference signal is adjusted, determine that the sending state of the reference signal of the cell needs to be adjusted.

Preferably, the processor 91 is specifically configured to: when one or more of the following cases occur in the cell, determine that the sending state of the reference signal needs to be adjusted:

a radio resource is overloaded;

a backhaul link network is overloaded;

a transmission delay in a backhaul link exceeds a set threshold; or a hardware resource is overloaded.

Preferably, the transmitter 92 is further configured to:

after the processor 91 adjusts the sending state of the reference signal of the cell, send indication information to a communications device in the cell, where the indication information is used for indicating at least one of the following indications:

an indication that the communications device in the cell determines, according to the adjusted sending state, of the reference signal, indicated by the indication information, whether to measure the reference signal;

an indication that the communications device in the cell measures the reference signal according to adjusted measurement configuration information indicated by the indication information;

an indication that the communications device in the cell no longer measures the reference signal; or an indication that the communications device in the cell measures a set type of reference signals, where the set type is different from a type of the adjusted reference signal.

Preferably, the transmitter 92 is specifically configured to send the indication information according to at least one of the following:

broadcasting the indication information to the communications device in the cell by using a system information block SIB; sending the indication information to the communications device in the cell by using dedicated radio resource control RRC signaling; broadcasting the indication information to the communications device in the cell by using a physical layer broadcast message; or sending the indication information to the communications device in the cell by using downlink control information DCI.

Preferably, the transmitter 92 is further configured to:

after the processor 91 adjusts the sending state of the reference signal of the cell, notify the communications device in the cell to receive data and/or control signaling on a resource carrying the reference signal.

Preferably, the transmitter 92 is specifically configured to notify, according to at least one of the following manners, the communications device in the cell to receive the data and/or control signaling on the resource carrying the reference signal:

notifying, by using a system information block SIB, the communications device in the cell to receive the data and/or control signaling on the resource carrying the reference signal;

notifying, by using dedicated radio resource control RRC signaling, the communications device in the cell to receive the data and/or control signaling on the resource carrying the reference signal;

notifying, by using a physical layer broadcast message, the communications device in the cell to receive the data and/or control signaling on the resource carrying the reference signal; or notifying, by using downlink control information DCI, the communications device in the cell to receive the data and/or control signaling on the resource carrying the reference signal.

Preferably, the transmitter 92 is specifically configured to:

after the communications device in the cell is notified to receive the control signaling on the resource carrying the reference signal, send, by using a physical layer control channel, the control signaling on the resource carrying the reference signal to the communications device in the cell; and/or after the communications device in the cell is notified to receive the data on the resource occupied when the reference signal is carried, send, by using a physical layer data channel, the data on the resource carrying the reference signal to the communications device in the cell.

Preferably, the transmitter 92 is further configured to: after the processor 91 adjusts the sending state of the reference signal of the cell, notify a communications node of a neighboring cell of the adjusted sending state of the reference signal of the cell, to enable the communications node of the neighboring cell to determine, according to the adjusted sending state of the reference signal of the cell, whether UE in the neighboring cell needs to measure the cell, and/or, determine configuration information for measuring the cell by UE in the neighboring cell.

Preferably, the transmitter 92 is further configured to: after the processor 91 adjusts the sending state of the reference signal of the cell that belongs to the first communications node, send the reference signal including load information of the cell.

Preferably, the transmitter 92 is specifically configured to:

send the reference signal according to a reference signal sending period corresponding to the load information;

send the reference signal including encoding information corresponding to the load information; or send the reference signal by using a bandwidth corresponding to the load information.

Preferably, the processor 91 is specifically configured to:

adjust the sending state of the reference signal of the cell by using a communications device managed by the first communications node; or adjust the sending state of the reference signal according to an adjustment manner indicated by a radio resource control RRC layer of the first communications node.

Preferably, the processor 91 is further configured to:

after it is determined that the sending state of the reference signal needs to be restored, restore the sending state of the reference signal; and the transmitter 92 is further configured to: send the reference signal by using a restored sending state.

Preferably, the reference signal is at least one of the following types of reference signals:

a synchronization signal;

a discovery reference signal Discovery RS;

a channel state information reference signal CSI-RS;

a cell-specific reference signal CRS;

a common demodulation reference signal DM-RS; or a cell-common reference signal.

Figure 10:
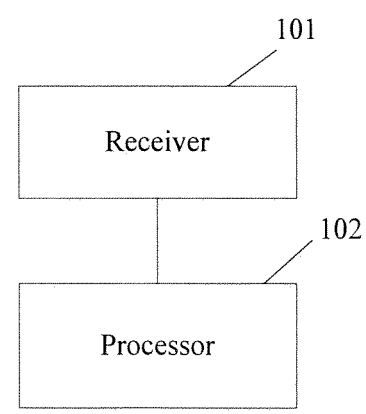
FIG. 10 is a structural diagram of a communications device for performing signal transmission according to Embodiment 8 of the present invention.

FIG. 10 is a structural diagram of a communications device for performing signal transmission according to Embodiment 8 of the present invention, where the communications device includes:

a receiver 101, configured to receive an adjusted reference signal, of a cell in which the communications device is located, sent by a first communications node, and transmit the adjusted reference signal to a processor 102; and the processor 102, configured to receive the adjusted reference signal, of the cell, transmitted by the receiver 101, and perform communication according to the adjusted reference signal, where the reference signal is: the reference signal sent by the first communications node according to an adjusted sending state of the reference signal.

Preferably, the processor 102 is further configured to:

receive indication information sent by the first communications node, where the indication information is used for indicating the sending state, of the reference signal, adjusted by the first communications node; and adjust measurement of the reference signal according to the adjusted sending state of the reference signal.

Preferably, the processor 102 is specifically configured to:

determine, according to the adjusted sending state, of the reference signal, indicated by the indication information, whether to measure the reference signal;

measure the reference signal according to adjusted measurement configuration information indicated by the indication information;

no longer measure the reference signal according to an indication, of no longer measuring the reference signal, in the indication information; or measure a first type of reference signals according to an indication, of measuring the first type of reference signals, in the indication information, where the first type is different from a type of the adjusted reference signal.

Preferably, the receiver 101 is specifically configured to:

receive, by using a system information block SIB, the indication information sent by a communications node of the cell in which the communications device is located; receive, by using dedicated radio resource control RRC signaling, the indication information sent by a communications node of the cell in which the communications device is located; receive, by using a physical layer broadcast message, the indication information sent by a communications node of the cell in which the communications device is located; or receive, by using downlink control information DCI, the indication information sent by a communications node of the cell in which the communications device is located.

Figure 11:
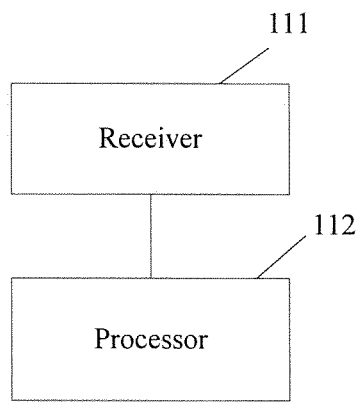
FIG. 11 is a structural diagram of a communications device for performing signal transmission according to Embodiment 9 of the present invention.

FIG. 11 is a structural diagram of a communications device for performing signal transmission according to Embodiment 9 of the present invention, where the communications device includes:

a receiver 111, configured to receive notification information sent by a first communications node, and transmit the received notification information to a processor 112, where the notification information is sent by the first communications node after the first communications node adjusts a sending state of a reference signal of a cell in which the communications device is located; and after an indication, of receiving data and/or control signaling on a resource carrying the reference signal, indicated by the processor 112 is received, receive, according to the notification information, the data and/or control signaling on the resource carrying the reference signal; and the processor 112, configured to receive the notification information transmitted by the receiver 111, and instruct, according to the notification information, the receiver 111 to receive the data and/or control signaling on the resource carrying the reference signal.

Preferably, the receiver 111 is specifically configured to:

receive, by using a physical layer control channel, the control signaling on the resource carrying the reference signal; and/or, receive, by using a physical layer data channel, the data on the resource carrying the reference signal.

Preferably, the receiver 111 is specifically configured to:

receive, in at least one of the following manners, the notification information sent by the first communications node:

receiving, by using a system information block SIB, the notification information sent by the first communications node; receiving, by using dedicated radio resource control RRC signaling, the notification information sent by the first communications node; receiving, by using a physical layer broadcast message, the notification information sent by the first communications node; or receiving, by using downlink control information DCI, the notification information sent by the first communications node.

Figure 12:
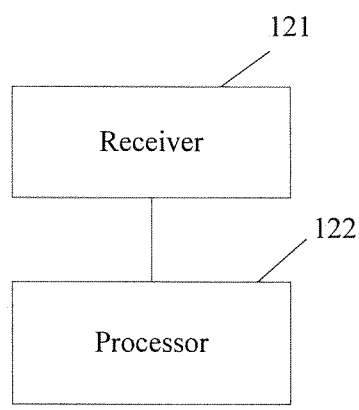
FIG. 12 is a structural diagram of a signal transmission device according to Embodiment 10 of the present invention.

FIG. 12 is a structural diagram of a signal transmission device according to Embodiment 10 of the present invention, where the signal transmission device includes:

a receiver 121, configured to receive an adjusted sending state, of a reference signal of a neighboring cell, sent by a communications node of the neighboring cell, and transmit the received adjusted sending state of the reference signal of the neighboring cell to a processor 122; and the processor 122, configured to control, according to the adjusted sending state, of the reference signal of the neighboring cell, received by the receiver 121, measurement of a cell of user equipment UE served by the device.

Preferably, the processor 122 is specifically configured to:

determine, according to the adjusted sending state, of the reference signal of the neighboring cell, received by the receiver 121, whether the UE served by the device needs to measure the neighboring cell, and/or, determine configuration information for measuring the neighboring cell by the UE served by the device.

Figure 13:
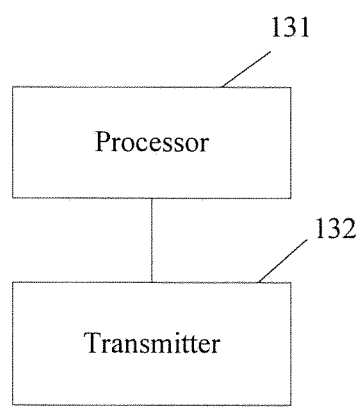
FIG. 13 is a structural diagram of a signal transmission device according to Embodiment 11 of the present invention.

FIG. 13 is a structural diagram of a signal transmission device according to Embodiment 11 of the present invention, where the signal transmission device includes:

a processor 131, configured to generate a reference signal of a cell in which a first communications node is located, and transmit the generated reference signal to a transmitter 132, where the reference signal carries load information of the cell in which the first communications node is located; and the transmitter 132, configured to receive the reference signal generated by the processor 131, and send the reference signal, where the reference signal is used for enabling a communications device that detects the reference signal to determine, according to the load information, whether to measure the cell, or determine whether to report a measurement result of measuring the cell, or determine whether to access the cell.

Preferably, the transmitter 132 is specifically configured to: send the reference signal according to at least one of the following:

sending the reference signal according to a reference signal sending period corresponding to the load information;

sending the reference signal including encoding information corresponding to the load information; or sending the reference signal by using a bandwidth corresponding to the load information.

Figure 14:
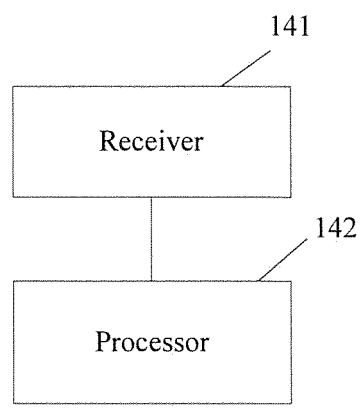
FIG. 14 is a structural diagram of a communications device for performing signal transmission according to Embodiment 12 of the present invention.

FIG. 14 is a structural diagram of a communications device for performing signal transmission according to Embodiment 12 of the present invention, where the communications device includes:

a receiver 141, configured to receive a reference signal sent by a first communications node, where the reference signal carries load information of a cell in which the first communications node is located, and transmit the received reference signal to a processor 142; and the processor 142, configured to receive the reference signal transmitted by the receiver 141, and determine, according to the load information, whether to measure the cell, or determine whether to report a measurement result of measuring the cell, or determine whether to access the cell.

Preferably, the processor 142 is specifically configured to determine the load information according to at least one of the following:

determining, according to a reference signal sending period of sending the reference signal by the first communications node, the load information included in the reference signal;

determining the load information according to encoding information included in the reference signal; or determining the load information according to a bandwidth occupied when the first communications node sends the reference signal.

On the basis of a same inventive concept, an embodiment of the present invention further provides a signal transmission method corresponding to the signal transmission device. Reference may be made to implementation of the following method for specific implementation of the foregoing device.

Figure 15:
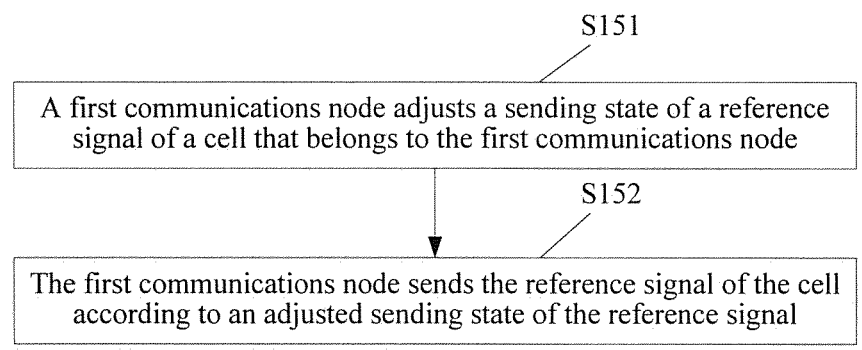
FIG. 15 is a flowchart of a signal transmission method according to Embodiment 1 of the present invention.

FIG. 15 is a flowchart of a signal transmission method according to Embodiment 1 of the present invention, where the signal transmission method includes:

S151: A first communications node adjusts a sending state of a reference signal of a cell that belongs to the first communications node.

S152: The first communications node sends the reference signal of the cell according to an adjusted sending state of the reference signal.

Herein, an adjusted reference signal refers to a reference signal that can enable UE, a base station or the like of another cell to discover a cell (referred to as a target cell below) of the first communications node, where the reference signal may include a cell identity (Identity, ID). The first communications node may be any device that can form or manage a particular signal coverage area, for example, a base station, a base station processor, and user equipment (User Equipment, UE). Specifically, the first communications node may be a base station, managing the target cell, in an LTE system. Correspondingly, another device may be specifically, for example, user equipment (User Equipment, UE) and/or a base station, outside the target cell. The first communications node may further be an RNC in a WCDMA system. Correspondingly, the another device may be specifically, for example, UE, a Node B or an RNC, outside the target cell. The first communications node may further be UE in Device-to-Device (D2D) communication. The target cell may be a signal coverage area formed by the UE. The another device may be specifically, for example, UE, a base station or a base station processor, outside the target cell.

In specific implementation, when the first communications node determines that the sending state of the reference signal needs to be adjusted, to prevent the another device from detecting or measuring or accessing the target cell, or to reduce a probability that the another device detects or measures or accesses the target cell, the first communications node adjusts the sending state of the reference signal of the target cell. Specifically, when determining that the managed target cell is overloaded, the first communications node may adjust the sending state of the reference signal.

This embodiment of the present invention may be applied to cell handover, where the first communications node actively chooses whether to allow another UE to access the target cell, or may also be applied to coordinated multiple point (Coordinated multiple point, CoMP) transmission, where the first communications node actively chooses whether to participate in CoMP transmission of another communications node, or may also be applied to assisted transmission of backhaul network data between base stations, or may further be applied to device-to-device (Device-to-Device, D2D) communication between UEs, or the like.

When this embodiment of the present invention is applied to cell handover, before UE detects or measures a target cell or accesses a target cell, the UE can know, according to a current sending state of a reference signal of the target cell, whether the target cell may accept the UE, thereby avoiding unnecessary workload produced because the target cell refuses to accept the UE. When this embodiment of the present invention is applied to CoMP transmission, before a base station requests another base station for coordinated transmission, the base station may know whether the another base station currently has a capability of CoMP transmission, thereby avoiding unnecessary signaling interactions between the base station and the another base station.

Figure 16:
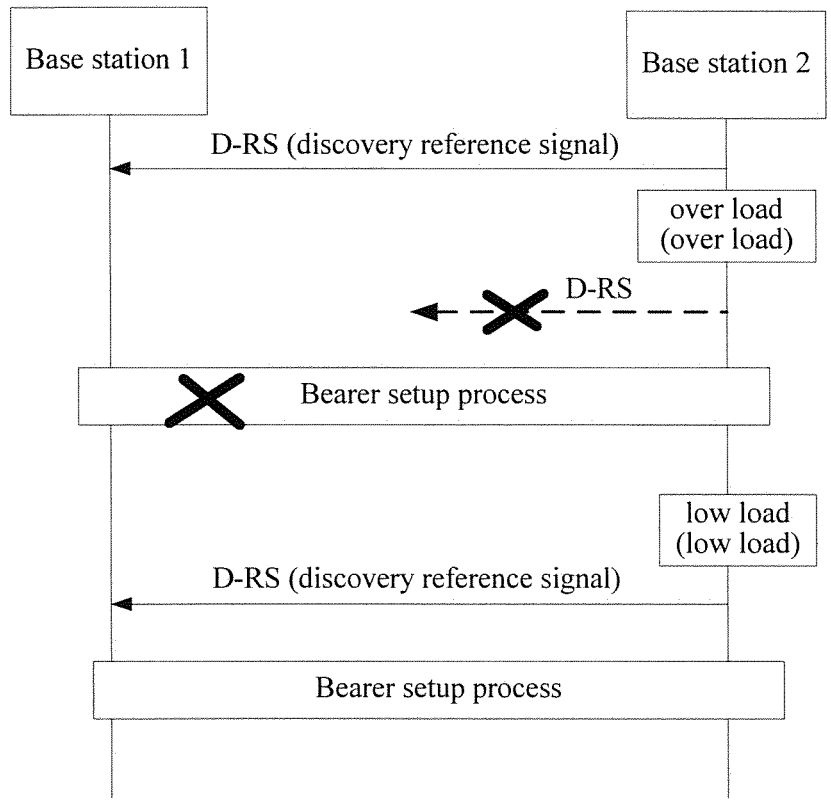
FIG. 16 is a schematic diagram of assisted transmission of backhaul network data between base stations according to an embodiment of the present invention.

FIG. 16 is a schematic diagram of assisted transmission of backhaul network data between base stations according to an embodiment of the present invention. When a backhaul network resource of a base station 1 is insufficient or unavailable, the base station 1 may be connected to a core network by using an air interface between the base station 1 and a base station 2. Specifically, the base station 1 transmits uplink (Uplink, UL) data to the base station 2, and the base station 2 transmits, by using a backhaul network resource of the base station 2, the received data of the base station 1 to the core network; or, the core network transmits downlink (Downlink, DL) data to the base station 2, and the base station 2 transmits, by using the air interface between the base station 1 and the base station 2, the received data to the base station 1. A precondition for application of such a transmission method is that the base station 2 can provide such a capability of assisting transmission of backhaul network data; for example, when the base station 2 has over load (over load), the base station 2 may be unable to provide the capability, and when the base station 2 has low load (low load), the base station 2 can provide the capability. In this embodiment of the present invention, before the base station 1 determines to transmit data in such a transmission manner, the base station 1 can know, according to a sending state, of a reference signal, sent by the base station 2, whether the base station 2 currently can provide the capability of assisting transmission of backhaul network data, so as to avoid occurrence of a case that when the base station 1 sends a bearer request to the base station 2, that is, requests the base station 2 to assist transmission of backhaul network data, the base station 2 rejects the request of the base station 1 because the base station 2 cannot provide the capability of assisting transmission of backhaul network data. Therefore, by means of this embodiment of the present invention, unnecessary signaling interactions between base stations can be reduced.

When this embodiment of the present invention is applied to D2D communication, before UE determines to transmit data with another communications device in a D2D communication manner, the UE can know, according to a sending state of a reference signal sent by the another communications device, whether the another communications device currently has a capability of performing D2D communication with the UE, thereby avoiding unnecessary signaling interactions produced because of a rejection when the UE sends a D2D communication request to the another communications device.

Preferably, in step S151, the adjusting, by a first communications node, a sending state of a reference signal of a cell that belongs to the first communications node includes: adjusting, by the first communications node, the sending state of the reference signal to be stopping sending the reference signal of the cell; and the sending, by the first communications node, the reference signal of the cell according to an adjusted sending state of the reference signal includes: stopping, by the first communications node, sending the reference signal of the cell; or the adjusting, by a first communications node, a sending state of a reference signal of a cell that belongs to the first communications node includes: lowering, by the first communications node, a sending power of sending the reference signal of the cell; and the sending, by the first communications node, the reference signal of the cell according to an adjusted sending state of the reference signal includes: sending, by the first communications node, the reference signal by using the lowered sending power; or the adjusting, by a first communications node, a sending state of a reference signal of a cell that belongs to the first communications node includes: extending, by the first communications node, a sending period of sending the reference signal of the cell; and the sending, by the first communications node, the reference signal of the cell according to an adjusted sending state of the reference signal includes: sending, by the first communications node, the reference signal by using the extended sending period; or the adjusting, by a first communications node, a sending state of a reference signal of a cell that belongs to the first communications node includes: lowering, by the first communications node, a bandwidth occupied when the reference signal of the cell is sent; and the sending, by the first communications node, the reference signal of the cell according to an adjusted sending state of the reference signal includes: sending, by the first communications node, the reference signal by using the lowered bandwidth.

In a specific implementation process, if the first communications node determines that the first communications node needs to prevent another device, for example, UE of another cell, from detecting or measuring or accessing a target cell, the first communications node may stop sending the reference signal; if the first communications node determines that the first communications node only needs to reduce a probability that the another device detects or measures or accesses the target cell, the first communications node may, instead of stopping sending the reference signal, only increase difficulty of detecting the target cell by the another device in a manner of lowering a sending power, extending a sending period, lowering an occupied bandwidth, or the like. Specifically, a coverage area of the reference signal can be lowered by lowering the sending power of sending the reference signal, so that a quantity of devices that detect or measure or access the target cell is reduced. The probability that the another device detects or measures or accesses the target cell can be reduced by extending the sending period of sending the reference signal. The coverage area of the reference signal can also be lowered by sending the reference signal by using a lowered occupied bandwidth. There are specifically two forms of lowering the occupied bandwidth: In one manner, a total bandwidth is lowered; for example, previously a 20 M bandwidth is occupied to send the reference signal, and after adjustment, only a 10 M bandwidth is occupied to send the reference signal; or, previously 110 physical resource blocks (Physical Resource Block, PRB) are occupied to send the reference signal, and after adjustment, only 6 PRBs in the middle are occupied to send the reference signal. In another manner, a total bandwidth is kept unchanged, but a density of frequency resources included in the total bandwidth is reduced; for example, a frequency density may be adjusted to be half as it is before.

Preferably, before step S151, the method further includes:

determining, by the first communications node, that the sending state of the reference signal of the cell needs to be adjusted.

In specific implementation, when determining that the first communications node needs to prevent another device from detecting or measuring or accessing the target cell, or reduce the probability that the another device detects or measures or accesses the target cell, the first communications node may determine to adjust the sending state of the reference signal of the target cell. Specifically, when determining that the managed target cell is overloaded, the first communications node may adjust the sending state of the reference signal.

Preferably, the determining, by the first communications node, that the sending state of the reference signal of the cell needs to be adjusted includes:

when one or more of the following cases occur in the cell, determining, by the first communications node, that the sending state of the reference signal needs to be adjusted:

a radio resource is overloaded;

a backhaul link network is overloaded;

a transmission delay in a backhaul link exceeds a set threshold; or a hardware resource is overloaded.

In a specific implementation process, when determining that the target cell is overloaded, the first communications node may adjust the sending state of the reference signal. There are multiple manifestations of that the target cell is overloaded, and the manifestations may be specifically: a radio resource is overloaded, a TNL network is overloaded, a hardware resource is overloaded, or the like. For a radio resource, a physical resource block (Physical Resource Block, PRB) is generally used as a minimum scheduling unit. In specific implementation, the first communications node may determine that a radio resource is overloaded when an occupation ratio of a radio resource exceeds a set threshold. For example, when a current occupation ratio of PRBs exceeds 70%, the first communications node determines that a radio resource is overloaded. A scheduler of the target cell may specifically determine that a radio resource is overloaded. When a TNL network is overloaded, it refers to that if the first communications node receives a link congestion indication fed back by another communications node when the first communications node sends data to the another communications node, for example, a routing device, it is determined that currently a backhaul link network is overloaded. A hardware resource is overloaded; for example, currently usage of a central processing unit (Central Processing Unit, CPU) exceeds a set threshold, or an occupation ratio of memory exceeds a set threshold.

In this embodiment of the present invention, after the sending state of the reference signal is adjusted, the target cell continues to communicate with a communications device that has gained access, for example, UE or a base station; that is, after the sending state of the reference signal is adjusted, the target cell continues to keep transmission states of a control channel and a data channel.

Preferably, after step S151, the method further includes:

sending, by the first communications node, indication information to a communications device in the cell, where the indication information is used for indicating at least one of the following indications:

an indication that the communications device in the cell determines, according to the adjusted sending state, of the reference signal, indicated by the indication information, whether to measure the reference signal;

an indication that the communications device in the cell measures the reference signal according to adjusted measurement configuration information indicated by the indication information;

an indication that the communications device in the cell no longer measures the reference signal; or an indication that the communications device in the cell measures a set type of reference signals, where the set type is different from a type of the adjusted reference signal.

Herein, the communications device may be a wireless communications device such as UE or a base station. In a specific implementation process, the first communications node may stop sending the reference signal to prevent another device from detecting, measuring, or accessing the target cell, or reduce, in a manner of lowering a sending power, extending a sending period, lowering an occupied bandwidth, or the like, the probability that the another device detects or measures or accesses the target cell. After adjusting the sending state of the reference signal, the first communications node may send the indication information to the communications device in the target cell. That is, after adjusting the sending state of the reference signal, the first communications node determines how to enable the communications device in the target cell to continue with RRM measurement, channel state information (Channel State Information, CSI) measurement, radio link management (Radio Link Management, RLM) measurement, and the like. In specific implementation, a manner of indication by the indication information may be explicit indication, or may also be implicit indication. That is, the first communications node may have a task, which needs to be executed by the communications device, represented explicitly in the indication information, or may also have a task, which needs to be executed by the communications device, manifested in other information related to the specifically indicated task, and the communications device may determine, according to an agreement with a network side, the indication information from the other information related to the specifically indicated task.

Specifically, the indication information may include the adjusted sending state of the reference signal, and the communications device may determine, according to the adjusted sending state, of the reference signal, indicated by the indication information, whether to measure the reference signal whose sending state is adjusted. For example, if the adjusted sending state of the reference signal is stopping sending the reference signal, the communications device determines that the communications device no longer measures the reference signal whose sending state is adjusted. If the adjusted sending state of the reference signal includes that sending is not stopped, the communications device determines to measure the reference signal whose sending state is adjusted. The indication information may explicitly indicate that the communications device determines whether to measure the adjusted sending state of the reference signal, or it may also be that after receiving the reference signal whose sending state is adjusted, the communications device determines, according to an agreement with a network side, whether to measure the reference signal whose sending state is adjusted. The indication information may further include adjusted measurement configuration information, and the communications device measures, according to the measurement configuration information, the reference signal whose sending state is adjusted. The adjusted measurement configuration information may be, as compared with the measurement configuration information before adjustment, the measurement configuration infatuation in which a measurement period is extended and/or the measurement configuration information in which a bandwidth occupied by measurement is lowered. Specifically, the indication information may explicitly indicate that the communications device measures, according to the measurement configuration information, the reference signal whose sending state is adjusted, or it may also be that after receiving the measurement configuration information, according to the agreement with the network side, the communications device measures, according to the measurement configuration information, the reference signal whose sending state is adjusted. The indication information may further indicate that the communications device no longer measures the reference signal whose sending state is adjusted. In this case, after the communications device no longer measures, according to the indication information, the reference signal whose sending state is adjusted, the communications device may select another reference signal to perform measurement. Herein, the other reference signal may be agreed upon in advance between the communications device and the network side, or may also be decided by the communications device. The indication infatuation may further indicate that the communications device measures a set type of reference signals. For example, if the adjusted sending state of the reference signal is stopping sending, the first communications node may further indicate that the communications device of the target cell performs RRM measurement, CSI measurement, RLM measurement, and the like by using another reference signal.

Preferably, the sending, by the first communications node, indication information to a communications device in the cell includes at least one of the following:

broadcasting, by the first communications node, the indication information to the communications device in the cell by using a system information block (System Information Block, SIB); sending the indication information to the communications device in the cell by using dedicated radio resource control RRC signaling; broadcasting the indication information to the communications device in the cell by using a physical layer broadcast message; or sending the indication information to the communications device in the cell by using downlink control information (Downlink Control Information, DCI).

Preferably, after step S151, the method further includes:

notifying, by the first communications node, the communications device in the cell to receive data and/or control signaling on a resource carrying the reference signal.

In a specific implementation process, after the first communications node stops sending reference signals that need to be adjusted, resources occupied before sending of these reference signals is stopped are used to transmit data and/or control signaling between the first communications node and all communications devices or a set communications device in the target cell. If the first communications node does not stop sending the reference signals that need to be adjusted, and instead, only extends a sending period or lowers an occupied bandwidth, or the like to send the reference signals, the first communications node may notify the communications device in the target cell to receive data and/or control signaling on some of the resources that carry the reference signals before. Herein, the communications device may be a wireless communications device such as UE or a base station. Specifically, the first communications node may explicitly notify, or may also implicitly notify the communications device in the target cell to receive data and/or control signaling on some of the resources that carry the reference signals before. For example, if the first communications node adjusts a reference signal sending period from 100 ms to 300 ms, idle 200 ms after the sending period is adjusted may be used to send data and/or control signaling to the communications device in the target cell. The first communications node may explicitly notify the communications device in the target cell to receive data and/or control signaling in the idle 200 ms, or according to an agreement with a network side, the communications device may also determine, according to the adjusted sending period of the reference signal of the first communications node, that the communications device needs to receive data and/or control signaling within the idle time. For another example, if the first communications node adjusts a 20 M bandwidth occupied to send the reference signal to only an occupied 1.4 M bandwidth in the middle, after the bandwidth occupied to send the reference signal is adjusted, the first communications node may explicitly or implicitly notify the communications device in the target cell that an idle bandwidth is used to send data and/or control signaling to the communications device in the target cell; that is, after adjusting the sending state of the reference signal, the first communications node may configure, for the communications device, a time slot and/or frequency resource, used to transmit data and/or control signaling, in resources that carry the reference signal before.

Preferably, the first communications node notifies, according to at least one of the following manners, the communications device in the cell to receive the data and/or control signaling on the resource carrying the reference signal:

notifying, by the first communications node by using a system information block SIB, the communications device in the cell to receive the data and/or control signaling on the resource carrying the reference signal;

notifying, by the first communications node by using dedicated radio resource control RRC signaling, the communications device in the cell to receive the data and/or control signaling on the resource carrying the reference signal;

notifying, by the first communications node by using a physical layer broadcast message, the communications device in the cell to receive the data and/or control signaling on the resource carrying the reference signal; or notifying, by the first communications node by using downlink control information DCI, the communications device in the cell to receive the data and/or control signaling on the resource carrying the reference signal.

Preferably, after the first communications node notifies the communications device in the cell to receive the control signaling on the resource carrying the reference signal, the first communications node sends, by using a physical layer control channel, the control signaling on the resource carrying the reference signal to the communications device in the cell; and/or after the first communications node notifies the communications device in the cell to receive the data on the resource occupied when the reference signal is carried, the first communications node sends, by using a physical layer data channel, the data on the resource carrying the reference signal to the communications device in the cell.

In a specific implementation process, the physical layer control channel may be specifically a physical downlink control channel (Physical Downlink Control Channel, PDCCH), an enhanced physical downlink control channel (Enhanced Physical Downlink Control Channel, ePDCCH), a physical HARQ indicator channel (Physical Hybrid ARQ Indicator Channel, PHICH) or the like; the physical layer data channel may be specifically a physical multicast channel (Physical Multicast Channel, PMCH), a physical downlink shared channel (Physical Downlink Shared Channel, PDSCH) or the like.

Preferably, after step S151, the method further includes:

notifying, by the first communications node, a communications node of a neighboring cell of the adjusted sending state of the reference signal of the cell, to enable the communications node of the neighboring cell to determine, according to the adjusted sending state of the reference signal of the cell, whether UE in the neighboring cell needs to measure the cell, and/or, determine configuration information for measuring the cell by UE in the neighboring cell.

In a specific implementation process, herein, the first communications node and the communications node may be specifically a base station or a base station processor. After adjusting the sending state of the reference signal of the target cell, the first communications node may further send the adjusted sending state of the reference signal to the communications node of the neighboring cell, to enable the communications node of the neighboring cell to determine, according to the adjusted sending state of the reference signal, whether UE in the neighboring cell needs to measure the target cell. For example, if the adjusted sending state of the reference signal of the first communications node is stopping sending the reference signal, the communications node of the neighboring cell determines that there is no need to measure the target cell. If the adjusted sending state of the reference signal of the first communications node is lowering a sending power for sending and/or extending a sending period for sending and/or lowering an occupied bandwidth for sending or the like, the communications node of the neighboring cell may determine that the UE still needs to measure the target cell, but the measurement configuration information needs to be adjusted. If the first communications node extends the sending period to send the reference signal, the communications node of the neighboring cell adjusts, according to the sending state of the reference signal, a measurement period of the UE in the current cell, to enable the UE to shorten a period of measuring the target cell. For example, the first communications node adjusts the sending state of the reference signal, and one time of sending in every 5 subframes is adjusted to one time of sending in every 10 subframes. Therefore, the communications node of the neighboring cell adjusts the measurement period of measuring the target cell by the UE in the current cell, so that measuring the target cell by the UE in the current cell once in every 5 subframes is adjusted to measuring the target cell once in every 10 subframes. Correspondingly, if the first communications node lowers an occupied bandwidth to send the reference signal, the communications node of the neighboring cell lowers a bandwidth occupied when the UE in the current cell measures the target cell. If the first communications node lowers a sending power to send the reference signal, when determining that signal transmission has a path loss, the communications node of the neighboring cell uses an adjusted sending power as a transmission power of the target cell, and compares the adjusted sending power with an actual received power, to determine the path loss, so as to determine a geographical relationship between the target cell and the neighboring cell.

Preferably, after the adjusting, by a first communications node, a sending state of a reference signal of a cell that belongs to the first communications node, the method further includes:

after the first communications node determines that the reference signal needs to be sent, sending the reference signal including load information of the cell.

Herein, a communications device that detects the reference signal may be specifically a base station, UE or the like. By means of this embodiment of the present invention, the communications device does not need to read a system broadcast message of an RRC layer, and also does not need to read other additional physical channel information, and the communications device can acquire load information of a target cell at the same time when the target cell is detected. Such a manner of obtaining the load information is highly efficient, and the communications device may determine, according to the load information, whether to measure the target cell, or determine whether to report a measurement result of measuring the target cell, or determine whether to access the target cell. For example, the load information indicates that the target cell has over load, and the communications device may determine not to measure the target cell, or not to report the measurement result, or not to access the target cell. The load information indicates that the target cell has light load, and the communications device may determine to measure the target cell, or to report the measurement result, or to access the target cell. The communications device may implement, according to configuration of the reference signal, fast detection of the reference signal and simultaneous acquisition of load of the target cell, thereby avoiding a reduced throughput because a serving cell cannot perform scheduling for the communications device due to long time reading of a system broadcast message.

Preferably, the sending, by the first communications node, the reference signal including load information of the cell includes at least one of the following:

sending, by the first communications node, the reference signal according to a reference signal sending period corresponding to the load information;

sending, by the first communications node, the reference signal including encoding information corresponding to the load information; or sending, by the first communications node, the reference signal by using a bandwidth corresponding to the load information.

In a specific implementation process, the load information may be added to the reference signal in various manners. For example, the first communications node sends the reference signal by using the reference signal sending period corresponding to the load information. According to an agreement with a network side, the communications device may determine the load information of the target cell according to the reference signal sending period. For example, there may be three load conditions of a cell, which are separately, in an ascending order of load, low load (low load), high load (high load), and over load (over load). For a cell with low load, the reference signal sending period is set to 100 ms; for a cell with high load, the reference signal sending period is set to 200 ms; and for a cell with over load, the reference signal sending period is set to 300 ms. Correspondingly, the first communications node sends the reference signal by occupying the bandwidth corresponding to the load information, and the communications device determines a load condition of the target cell according to the bandwidth occupied by the reference signal. The encoding information corresponding to the load information may be further added to the reference signal. For example, one bit is added to the reference signal to represent the load information. Specifically, bit 0 represents normal load of a cell, and bit 1 represents over load of a cell.

Preferably, in step S151, the adjusting, by a first communications node, a sending state of a reference signal of a cell that belongs to the first communications node includes:

adjusting, by the first communications node, the sending state of the reference signal of the cell by using the communications device managed by the first communications node; or adjusting, by a physical layer of the first communications node, the sending state of the reference signal according to an adjustment manner indicated by a radio resource control (Radio Resource Control, RRC) layer of the first communications node.

In a specific implementation process, in a process of sending the reference signal, the first communications node may determine, by using a radio resource management (Radio Resource Management, RRM) function of the first communications node, that the sending state of the reference signal needs to be adjusted, and may then adjust the sending state of the reference signal, or may also instruct another managed communications node in the target cell to adjust the sending state of the reference signal. Specifically, the first communications node may be a base station, and the target cell is a signal coverage area formed by signal transmission of the base station; in this case, the base station may adjust the sending state of the reference signal. When the first communications node instructs another managed communications node to adjust the sending state of the reference signal, the first communications node may be a base station, and the managed another communications node may be a remote radio port (Remote Radio Head, RRH) or the like.

In a specific implementation process, the RRC layer of the first communications node may determine a specific adjustment manner of adjusting the sending state of the reference signal, for example, stopping sending the reference signal, lowering a sending power to send the reference signal, lowering an occupied bandwidth to send the reference signal, extending a sending period to send the reference signal, and transmit the determined adjustment manner to a physical layer, to instruct the physical layer to adjust, according to the adjustment manner, the sending state of the reference signal.

Preferably, after step S151, the method further includes:

after the first communications node determines that the sending state of the reference signal needs to be restored, restoring the sending state of the reference signal, and sending the reference signal by using a restored sending state.

In a specific implementation process, after load of the target cell becomes normal, the first communications node may restore the sending state of the reference signal. For example, if sending of the reference signal is stopped before, sending of the reference signal is restored. If the sending power of sending the reference signal is lowered before, the previous sending power is restored to send the reference signal. If the sending period of sending the reference signal is extended before, the previous sending period is restored to send the reference signal. If the bandwidth occupied to send the reference signal is lowered before, the previous occupied bandwidth is restored to send the reference signal.

In a specific implementation process, an operation related to restoration of the sending state of the reference signal corresponds to previous adjustment of the sending state of the reference signal; for example:

Preferably, the restoring, by the first communications node, the sending state of the reference signal of the target cell includes: restoring, by the first communications node, the sending state of the reference signal of the target cell by using another communications node managed by the first communications node.

Preferably, the restoring, by the first communications node, the sending state of the reference signal of the target cell includes: restoring, by a physical layer of the first communications node, the sending state of the reference signal according to a restoration manner indicated by the RRC layer of the first communications node.

Preferably, after the restoring, by the first communications node, the sending state of the reference signal, the method further includes: sending, by the first communications node, indication information to the communications device in the target cell, where the indication information is used for instructing the communications device in the target cell to determine, according to the restored sending state of the reference signal indicated by the indication information, whether to measure the reference signal after the sending state is restored; or, the indication information is used for instructing the communications device in the target cell to measure, according to restored measurement configuration information indicated by the indication information, the reference signal after the sending state is restored; or, the indication information is used for instructing the communications device in the target cell to restore measurement of the reference signal.

Preferably, after the restoring, by the first communications node, the sending state of the reference signal of the target cell, the method further includes: notifying, by the first communications node, the communications device in the target cell of that sending of the reference signal is restored in the target cell.

Preferably, the first communications node may notify, by using an SIB, dedicated RRC signaling, a physical layer broadcast message, DCI or the like, the communications device in the target cell of that sending of the reference signal is restored in the target cell.

Preferably, after the restoring, by the first communications node, the sending state of the reference signal of the target cell, a communications node of a neighboring cell may further be notified of that the sending state of the reference signal has been restored in the target cell, to enable the communications node of the neighboring cell to determine, according to the restored sending state of the reference signal of the target cell, whether UE in the neighboring cell needs to measure the target cell, or, determine configuration information for measuring the target cell by UE in the neighboring cell.

Preferably, the first communications node may further receive the restored sending state, of the reference signal of the neighboring cell, sent by a communications node of the neighboring cell. The first communications node determines, according to the received restored sending state of the reference signal of the neighboring cell, whether UE in the target cell needs to measure the neighboring cell, or, determines configuration information for measuring the neighboring cell by UE in the target cell.

Preferably, the foregoing reference signal is a cell-common reference signal. That is, herein, the reference signal is a cell-level reference signal, and all communications devices that have gained access to the cell can measure the reference signal.

Preferably, the foregoing reference signal is at least one of the following types of reference signals:

a synchronization signal;

a discovery reference signal (Discovery Reference Signal, Discovery RS);

a channel state information reference signal (Channel State Information Reference Signals, CSI-RS);

a cell-specific reference signal (Cell-specific Reference Signal, CRS); or a common demodulation reference signal (Demodulation Reference Signals, DM-RS).

It should be noted that, herein, the Discovery RS may also be referred to as a detection reference signal (Detection Reference Signal, Detection RS). The communications device may measure the reference signal by using a physical downlink shared channel (Physical Downlink Shared Channel, PDSCH). Herein, the common DM-RS is a cell-level demodulation reference signal, and may be represented by using a common sequence or a sequence of a cell. That is, the common DM-RS is a demodulation reference signal that can be measured by all communications devices in a cell. The synchronization signal includes a primary synchronization signal (Primary Synchronization Signal, PSS) and a secondary synchronization signal (Secondary Synchronization Signal, SSS).

Preferably, the method further includes:

receiving, by the first communications node, the adjusted sending state, of the reference signal of the neighboring cell, sent by a communications node of the neighboring cell; and determining, by the first communications node according to the received adjusted sending state of the reference signal of the neighboring cell, whether UE in the target cell needs to measure the neighboring cell, or, after it is determined that the UE in the target cell needs to measure the neighboring cell, determining configuration information for measuring the neighboring cell by the UE in the target cell.

In a specific implementation process, the first communications node may be both a sender of a reference signal of a current cell and a receiver of a reference signal of a neighboring cell, and may determine, according to a received adjusted sending state of a the reference signal of the neighboring cell, whether UE in a target cell needs to measure the neighboring cell, or after it is determined that the UE in the target cell needs to measure the neighboring cell, adjust measurement configuration information for the UE in the target cell. For a specific step of adjusting the measurement configuration information, reference may be made to the foregoing description of that the communications node of the neighboring cell adjusts the measurement configuration information of the UE in the neighboring cell.

Figure 17:
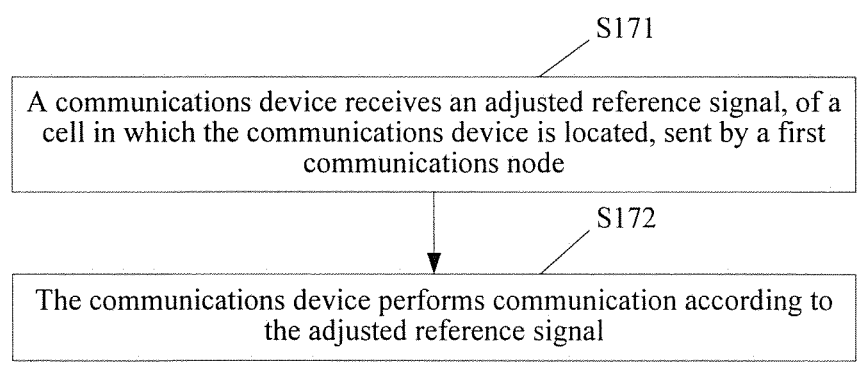
FIG. 17 is a flowchart of a signal transmission method according to Embodiment 2 of the present invention.

FIG. 17 is a flowchart of a signal transmission method according to Embodiment 2 of the present invention, where the signal transmission method includes:

S171: A communications device receives an adjusted reference signal, of a cell in which the communications device is located, sent by a first communications node.

S172: The communications device performs communication according to the adjusted reference signal.

The reference signal is: the reference signal sent by the first communications node according to an adjusted sending state of the reference signal.

Preferably, before step S171, the method further includes:

receiving, by the communications device, indication information sent by the first communications node, where the indication information is used for indicating the sending state, of the reference signal, adjusted by the first communications node; and adjusting, by the communications device, measurement of the reference signal according to the adjusted sending state of the reference signal.

Preferably, the adjusting, by the communications device, measurement of the reference signal according to the adjusted sending state, of the reference signal, indicated by the indication information includes at least one of the following:

determining, by the communications device according to the adjusted sending state, of the reference signal, indicated by the indication information, whether to measure the reference signal;

measuring, by the communications device, the reference signal according to adjusted measurement configuration information indicated by the indication information;

no longer measuring, by the communications device, the reference signal according to an indication, of no longer measuring the reference signal, in the indication information; or measuring, by the communications device, a first type of reference signals according to an indication, of measuring the first type of reference signals, in the indication information, where the first type is different from a type of the adjusted reference signal.

Herein, corresponding to the signal transmission method in FIG. 15, the communications device may be UE, a base station or the like. A communications node of the cell in which the communications device is located may be specifically a base station, a base station processor, UE or the like. When the communications node is UE herein, the foregoing method may be applied to a scenario of D2D communication, and a cell in which the UE is located refers to a signal coverage area formed by another UE.

In a specific implementation process, a communications node of a cell in which a communications device is located adjusts a reference signal of the current cell to prevent another device from detecting or measuring or accessing the current cell, or to reduce a probability that the another device detects or measures or accesses the current cell. At the same time, to enable the communications device in the current cell to perform a normal measurement process, after receiving indication information sent by the communications node of the current cell, the communications device performs related measurement adjustment according to the indication information. Specifically, the communications device may determine, according to an adjusted sending state, of the reference signal, indicated by the indication information, whether to measure the reference signal whose sending state is adjusted; for example, when the adjusted sending state of the reference signal is stopping sending, the communications device determines to no longer measure the reference signal of which sending is stopped. The communications device may further measure, according to adjusted measurement configuration information indicated by the indication information, the reference signal whose sending state is adjusted; for example, the measurement configuration information may be measurement configuration information including an extended measurement period, and/or, may be measurement configuration information including a lowered bandwidth occupied for measurement. The communications device may further no longer measure the reference signal according to the received indication information of no longer measuring the reference signal. The communications device may further measure, according to the received indication information of measuring a set type of reference signals, the set type of reference signals. Herein, to ensure a normal measurement process of the communications device in the current cell after the reference signal is adjusted, another type of reference signals, different from a type of the adjusted reference signal, may be set for the communications device to perform measurement.

Preferably, the receiving, by the communications device, indication information sent by the first communications node includes at least one of the following:

receiving, by the communications device by using a system information block SIB, the indication information sent by a communications node of the cell in which the communications device is located; receiving, by using dedicated radio resource control RRC signaling, the indication information sent by a communications node of the cell in which the communications device is located; receiving, by using a physical layer broadcast message, the indication information sent by a communications node of the cell in which the communications device is located; or receiving, by using downlink control information DCI, the indication information sent by a communications node of the cell in which the communications device is located.

In a specific implementation process, if the first communications node determines to restore the sending state of the reference signal, the communications device may further receive the indication information sent by the first communications node after the sending state of the reference signal is restored. A specific manner of receiving the indication information and a related operation performed according to the indication information correspond to that the first communications node sends the indication information, and are no longer elaborated herein.

Figure 18:
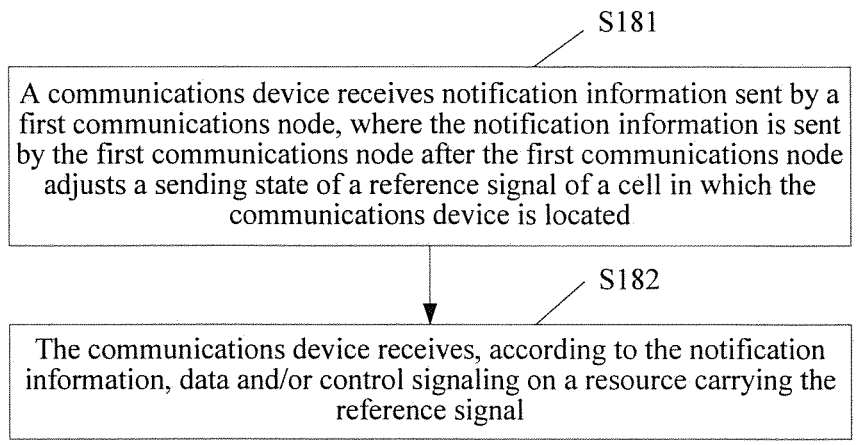
FIG. 18 is a flowchart of a signal transmission method according to Embodiment 3 of the present invention.

FIG. 18 is a flowchart of a signal transmission method according to Embodiment 3 of the present invention, where the signal transmission method includes:

S181: A communications device receives notification information sent by a first communications node, where the notification information is sent by the first communications node after the first communications node adjusts a sending state of a reference signal of a cell in which the communications device is located.

S182: The communications device receives, according to the notification information, data and/or control signaling on a resource carrying the reference signal.

Herein, the communications device may be a wireless communications device such as UE or a base station, and a communications node of the cell in which the communications device is located may be UE, a base station, a base station processor, or the like.

Preferably, the receiving, by the communications device, data and/or control signaling on a resource carrying the reference signal includes:

receiving, by the communications device by using a physical layer control channel, the control signaling on the resource carrying the reference signal; and/or, receiving, by using a physical layer data channel, the data on the resource carrying the reference signal.

Preferably, the receiving, by a communications device, notification information sent by a first communications node includes at least one of the following:

receiving, by the communications device by using a system information block SIB, the notification information sent by the first communications node; receiving, by using a dedicated radio resource control RRC signaling, the notification information sent by the first communications node; receiving, by using a physical layer broadcast message, the notification information sent by the first communications node; or receiving, by using downlink control information DCI, the notification information sent by the first communications node.

In a specific implementation process, if the first communications node determines to restore the sending state of the reference signal, the communications device may further receive the notification information sent after the first communications node restores the sending state of the reference signal. A specific manner of receiving the notification information and a related operation performed according to the notification information correspond to that the first communications node sends the notification information, and are no longer elaborated herein.

Figure 19:
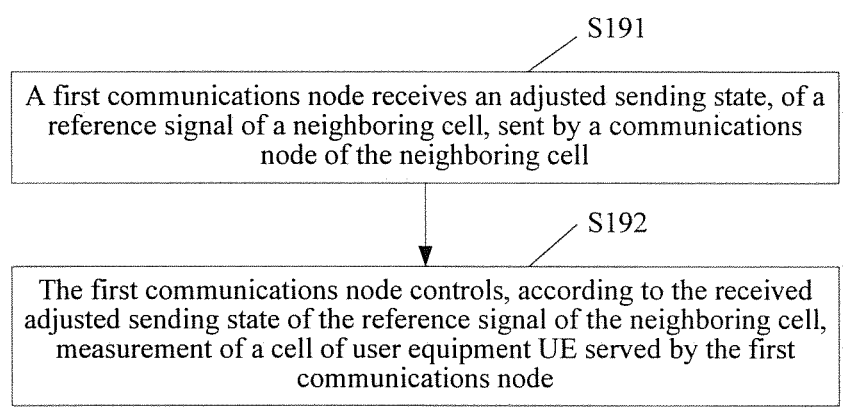
FIG. 19 is a flowchart of a signal transmission method according to Embodiment 4 of the present invention.

FIG. 19 is a flowchart of a signal transmission method according to Embodiment 4 of the present invention, where the signal transmission method includes:

S191: A first communications node receives an adjusted sending state, of a reference signal of a neighboring cell, sent by a communications node of the neighboring cell.

S192: The first communications node controls, according to the received adjusted sending state of the reference signal of the neighboring cell, measurement of a cell of user equipment UE served by the first communications node.

Preferably, in step S192, the controlling, by the first communications node according to the received adjusted sending state of the reference signal of the neighboring cell, measurement of a cell of user equipment UE served by the first communications node includes:

determining, by the first communications node according to the received adjusted sending state of the reference signal of the neighboring cell, whether the UE served by the first communications node needs to measure the neighboring cell, and/or, determining configuration information for measuring the neighboring cell by the UE served by the first communications node.

In a specific implementation process, after receiving the adjusted sending state, of the reference signal of the neighboring cell, sent by the communications node of the neighboring cell, the first communications node determines, according to the adjusted sending state of the reference signal, whether UE in a current cell needs to measure the neighboring cell. For example, if the adjusted sending state of the reference signal of the communications node of the neighboring cell is stopping sending the reference signal, the first communications node determines that there is no need to measure a target cell. If the adjusted sending state of the reference signal of the first communications node is lowering a sending power for sending and/or extending a sending period for sending and/or lowering an occupied bandwidth for sending or the like, the communications node of the neighboring cell can determine that the UE still needs to measure the target cell, but measurement configuration information needs to be adjusted. If the first communications node extends the sending period to send the reference signal, the communications node of the neighboring cell adjusts, according to the sending state of the reference signal, a measurement period of the UE in the current cell, to enable the UE to shorten a period of measuring the target cell. For example, the first communications node adjusts the sending state of the reference signal, and one time of sending in every 5 subframes is adjusted to one time of sending in every 10 subframes. Therefore, the communications node of the neighboring cell adjusts the measurement period of measuring the target cell by the UE in the current cell, so that measuring the target cell by the UE in the current cell once in every 5 subframes is adjusted to measuring the target cell once in every 10 subframes. Correspondingly, if the first communications node lowers the occupied bandwidth to send the reference signal, the communications node of the neighboring cell lowers a bandwidth occupied when the UE in the current cell measures the target cell. If the first communications node lowers the sending power to send the reference signal, when determining that signal transmission has a path loss, the communications node of the neighboring cell uses an adjusted lowered sending power as a transmission power of the target cell, and compares the adjusted lowered sending power with an actual received power, to determine the path loss, so as to determine a geographical relationship between the target cell and the neighboring cell.

Figure 20:
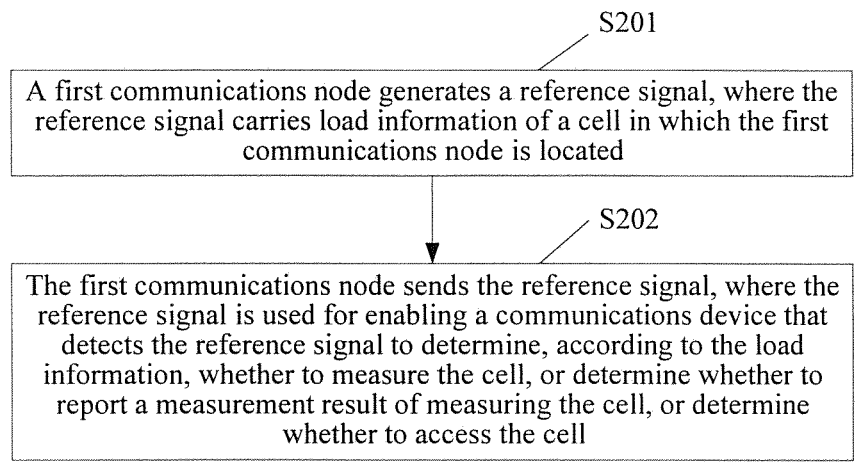
FIG. 20 is a flowchart of a signal transmission method according to Embodiment 5 of the present invention.

FIG. 20 is a flowchart of a signal transmission method according to Embodiment 5 of the present invention, where the signal transmission method includes:

S201: A first communications node generates a reference signal, where the reference signal carries load information of a cell in which the first communications node is located.

S202: The first communications node sends the reference signal, where the reference signal is used for enabling a communications device that detects the reference signal to determine, according to the load information, whether to measure the cell, or determine whether to report a measurement result of measuring the cell, or determine whether to access the cell.

Preferably, in step S202, the sending, by the first communications node, the reference signal includes at least one of the following:

sending, by the first communications node, the reference signal according to a reference signal sending period corresponding to the load information;

sending, by the first communications node, the reference signal including encoding information corresponding to the load information; or sending, by the first communications node, the reference signal by using a bandwidth corresponding to the load information.

Figure 21:
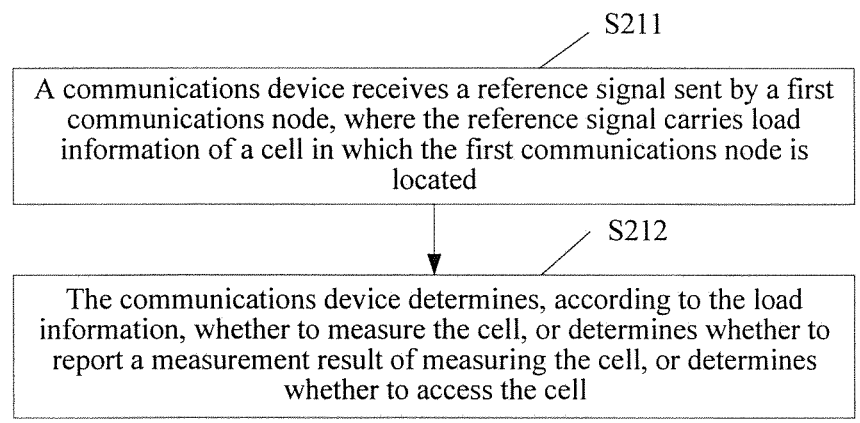
FIG. 21 is a flowchart of a signal transmission method according to Embodiment 6 of the present invention.

FIG. 21 is a flowchart of a signal transmission method according to Embodiment 6 of the present invention, where the signal transmission method includes:

S211: A communications device receives a reference signal sent by a first communications node, where the reference signal carries load information of a cell in which the first communications node is located.

S212: The communications device determines, according to the load information, whether to measure the cell, or determines whether to report a measurement result of measuring the cell, or determines whether to access the cell.

In a specific implementation process, the communications device may determine, according to a load condition indicated by the load information, whether to measure the target cell, and report the target cell to a communications node, for example, a base station, of a cell in which the managed communications device is located, or after the target cell is measured, determine whether a measurement result needs to be reported to a communications node managing a current cell, or determine whether to access the target cell. For example, the communications device and a network side agree on three types of load information, where the types include, in an ascending order of load, low load, high load, and over load. After determining, according to the load information, that the target cell has over load, the communications device determines not to measure the target cell or determines not to access the target cell. Alternatively, after determining, according to the load information, that the target cell has high load, the communications device determines to measure the target cell, and after measurement, determines, in combination with the measurement result and the load information, whether the measurement result needs to be reported to the communications node managing the communications device.

In a specific implementation process, the communications device may receive the reference signal, including load information of different target cells, sent by different first communications nodes, and separately determine whether to measure these target cells, or according to the received load information, based on a principle of preferentially measuring a target cell having relatively low load, after an order of measuring these target cells is arranged, sequentially report the target cells to the communications node of the cell in which the managed communications device is located, to enable a target cell having relatively low load to be measured preferentially, thereby ensuring that a preferentially reported cell is a cell having a highest possibility to accept the communications device.

Preferably, before the determining, by the communications device according to the load information, whether to measure the cell, or determining whether to report a measurement result of measuring the cell, or determining whether to access the cell, the method further includes at least one of the following:

determining, by the communications device according to a reference signal sending period of sending the reference signal by the first communications node, the load information included in the reference signal;

determining the load information according to encoding information included in the reference signal; or determining the load information according to a bandwidth occupied when the first communications node sends the reference signal.

According to an agreement with a network side or according to an indication by the first communications node, after receiving the reference signal, herein, the communications device may determine a load condition of the target cell according to the signal sending period of sending the reference signal by the first communications node, and/or, determine a load condition of the target cell according to the encoding information included in the reference signal, and/or, determine a load condition of the target cell according to the bandwidth occupied when the first communications node sends the reference signal.

Preferably, the load information includes information about whether the target cell has over load as determined by the first communications node. The determining, by the communications device according to the load information, whether to measure the target cell or determining whether to report a measurement result of measuring the target cell or determining whether to access the target cell includes:

if the load information is that the target cell has over load, determining not to measure the target cell or not to report the measurement result or not to access the target cell.

In a specific implementation process, the load information may have various manifestation forms. For example, the load information may be classified into two types, including over load and non-over load, or the load information may further be classified into low load, high load, over load, and the like.

By means of this embodiment of the present invention, a communications device does not need to read a system broadcast message of an RRC layer to acquire load information, and can acquire, without needing to read another physical channel message, load information of a target cell at the same time when the target cell is detected, and determine, according to the load information, whether to measure the target cell or determine whether to report a measurement result of measuring the target cell or determine whether to access the target cell, thereby reducing some unnecessary processes of measurement and signaling interactions, and increasing efficiency of cell handover.

To describe in detail the signal transmission method in this embodiment of the present invention, several relatively specific implementation manners are listed below for introduction.

Figure 22:
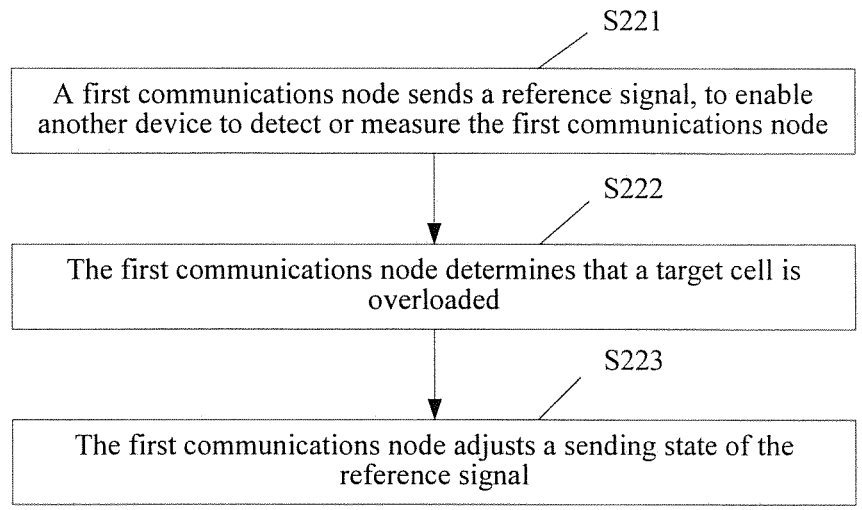
FIG. 22 is a flowchart of a signal transmission method according to Implementation Manner 1 of the present invention.

FIG. 22 is a flowchart of a signal transmission method according to Implementation Manner 1 of the present invention, where the signal transmission method includes:

S221: A first communications node sends a reference signal, to enable another device to detect or measure the first communications node.

Herein, the reference signal is sent by the first communications node, and may enable the another device to detect a signal of a target cell managed by the first communications node, where the reference signal may include a cell identity, and may be specifically any one or more of a synchronization signal including a PSS and an SSS, a Discovery RS, a Detection RS, a CSI-RS, a CRS, and a DM-RS. Herein, the another device may be specifically UE, a base station, a base station processor, or the like outside the target cell.

S222: The first communications node determines that a target cell is overloaded.

Herein, that the target cell is overloaded refers to that a radio resource is overloaded, a backhaul link network is overloaded, a hardware resource is overloaded, or the like.

S223: The first communications node adjusts a sending state of the reference signal.

Herein, the adjusting a sending state of the reference signal may be specifically: stopping sending the reference signal, to prevent the another device outside the target cell from detecting or measuring or accessing the target cell; or may further be: lowering a power to send the reference signal, to lower a coverage area of the reference signal, thereby reducing a quantity of devices that detect or measure or access the target cell; or may further be: extending a sending period to send the reference signal, so that a probability that the another device detects or measures or accesses the target cell is reduced; or may further be: lowering an occupied bandwidth to send the reference signal, so that a coverage area of the reference signal can also be lowered.

Figure 23:
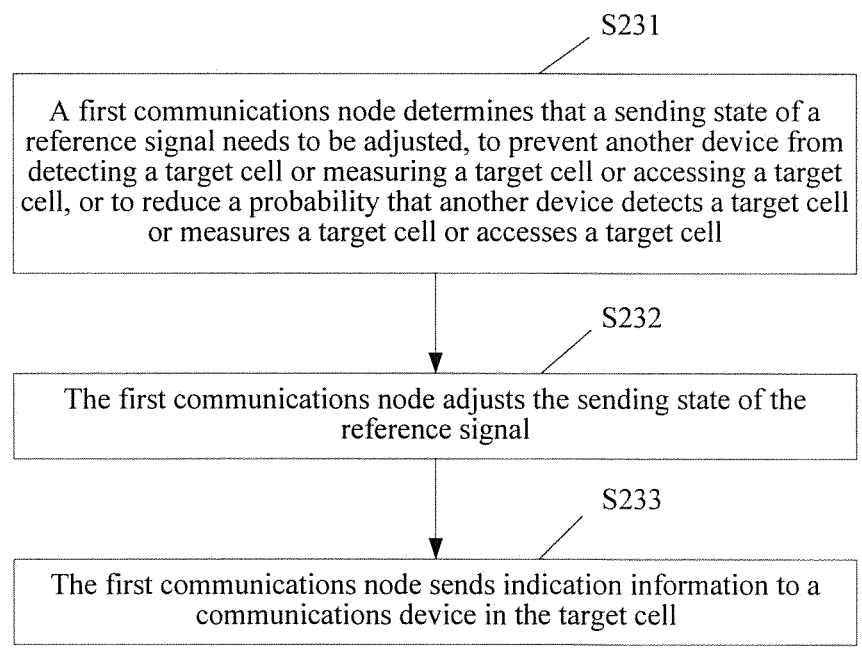
FIG. 23 is a flowchart of a signal transmission method according to Implementation Manner 2 of the present invention.

FIG. 23 is a flowchart of a signal transmission method according to Implementation Manner 2 of the present invention, where the signal transmission method includes:

S231: A first communications node determines that a sending state of a reference signal needs to be adjusted, to prevent another device from detecting a target cell or measuring the target cell or accessing the target cell, or to reduce a probability that the another device from detecting the target cell or measuring the target cell or accessing the target cell.

S232: The first communications node adjusts the sending state of the reference signal.

Specifically, the adjusting the sending state of the reference signal may be specifically: stopping sending the reference signal, to prevent the another device outside the target cell from detecting or measuring or accessing the target cell; or may further be: lowering a power to send the reference signal, to lower a coverage area of the reference signal, thereby reducing a quantity of devices that detect or measure or access the target cell; or may further be: extending a sending period to send the reference signal, so that a probability that the another device detects or measures or accesses the target cell is reduced; or may further be: lowering an occupied bandwidth to send the reference signal, so that a coverage area of the reference signal can also be lowered.

S233: The first communications node sends indication information to a communications device in the target cell, where the indication information is used for instructing the communications device in the target cell to determine, according to an adjusted sending state, of the reference signal, indicated by the indication information, whether to measure the reference signal whose sending state is adjusted; or, instructing the communications device in the target cell to measure, according to adjusted measurement configuration information indicated by the indication information, the reference signal whose sending state is adjusted; or, instructing the communications device in the target cell to no longer measure the reference signal whose sending state is adjusted; or, instructing the communications device in the target cell to measure a set type of reference signals, where the set type is different from a type of the reference signal whose sending state is adjusted.

In specific implementation, the first communications node may send the indication information to the communications device in the target cell in the following manners:

The first communications node broadcasts the indication information to the communications device in the target cell by using an SIB; or, sends the indication information to the communications device in the target cell by using dedicated RRC signaling; or, broadcasts the indication information to the communications device in the target cell by using a physical layer broadcast message; or, sends the indication information to the communications device in the target cell by using DCI.

Figure 24:
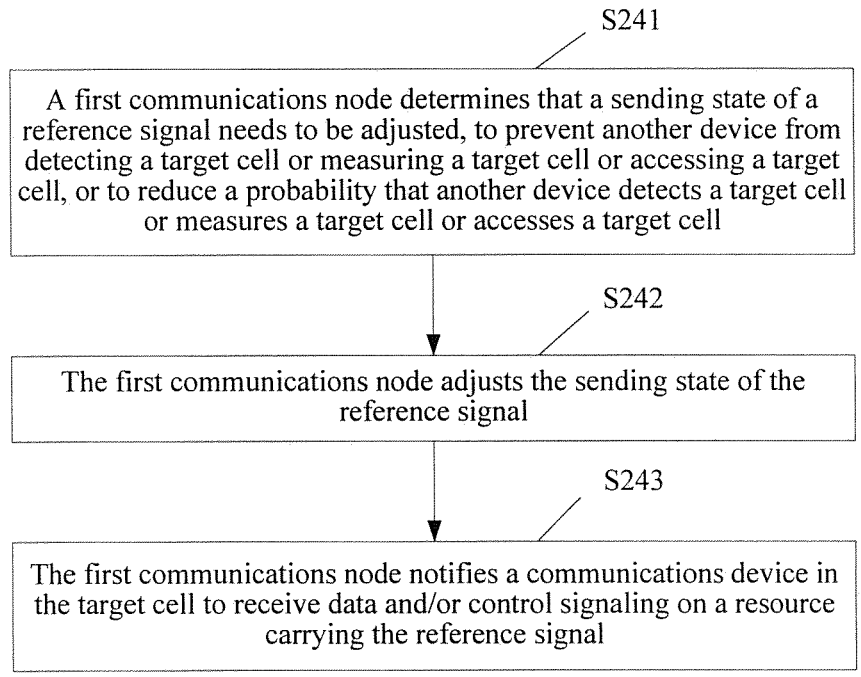
FIG. 24 is a flowchart of a signal transmission method according to Implementation Manner 3 of the present invention.

FIG. 24 is a flowchart of a signal transmission method according to Implementation Manner 3 of the present invention, where the signal transmission method includes:

S241: A first communications node determines that a sending state of a reference signal needs to be adjusted, to prevent another device from detecting a target cell or measuring the target cell or accessing the target cell, or to reduce a probability that the another device detects the target cell or measures the target cell or accesses the target cell.

S242: The first communications node adjusts the sending state of the reference signal.

S243: The first communications node notifies a communications device in the target cell to receive data and/or control signaling on a resource carrying the reference signal.

Herein, the communications device may be UE, or may also be a device such as a base station that has gained access to the target cell. When the communications device is UE, herein, the first communications node may be a base station, or a base station processor, or may also be another UE. When the first communications node is another UE, the implementation manner is applicable to D2D communication.

Figure 25:
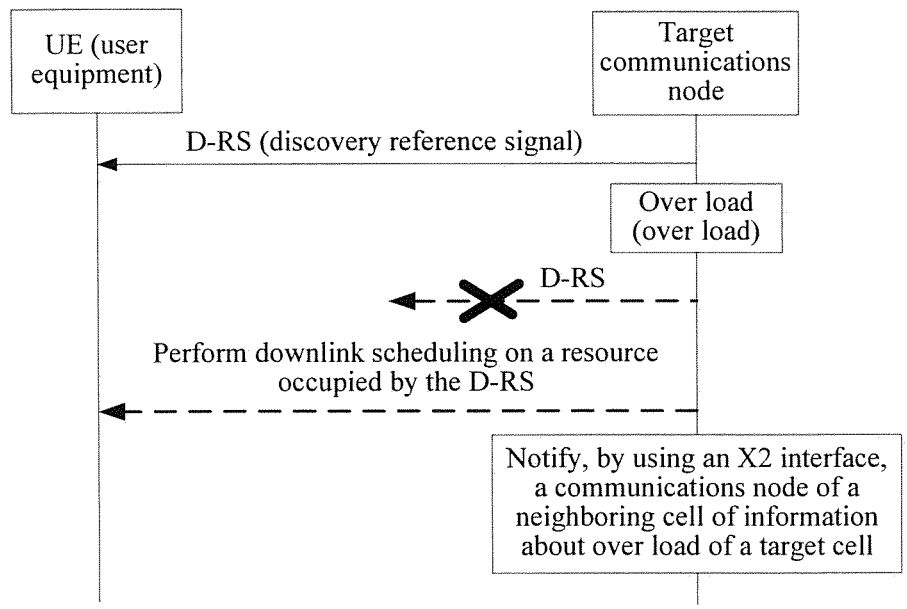
FIG. 25 is a schematic diagram of notifying UE in a target cell of that sending of a reference signal is stopped after a first communications node has over load (over load)

FIG. 25 is a schematic diagram of notifying UE in a target cell of that sending of a reference signal is stopped after a first communications node has over load (over load), where the first communications node is a pico base station (Pico eNB), and the reference signal is a Discovery RS (also referred to as a Detection RS), and is referred to as a D-RS for short. After the first communications node stops sending reference signals that need to be adjusted, resources occupied before sending of these reference signals is stopped are used to transmit data and/or control signaling between the first communications node and all UEs or set UEs in the target cell. Herein, the first communications node further notifies, by using an X2 interface, a communications node of a neighboring cell of information about over load of the target cell.

Preferably, in a specific implementation process, the first communications node may notify, in a manner same as that of sending the indication information in Implementation Manner 2 above, a communications device in the target cell to receive data and/or control signaling on a resource of the reference signal, including:

notifying, by the first communications node by using an SIB, the communications device in the target cell to receive data and/or control signaling on a resource carrying the reference signal; or, notifying, by the first communications node by using dedicated RRC signaling, the communications device in the target cell to receive data and/or control signaling on a resource carrying the reference signal; or, notifying, by the first communications node by using a physical layer broadcast message, the communications device in the target cell to receive data and/or control signaling on a resource carrying the reference signal; or notifying, by the first communications node by using DCI, the communications device in the target cell to receive data and/or control signaling on a resource carrying the reference signal.

Preferably, the first communications node may send, by using a physical layer control channel, control signaling to the communications device in the target cell on a resource carrying the reference signal, or may send, by using a physical layer data channel, data to the communications device in the target cell on a resource carrying the reference signal.

Figure 26:
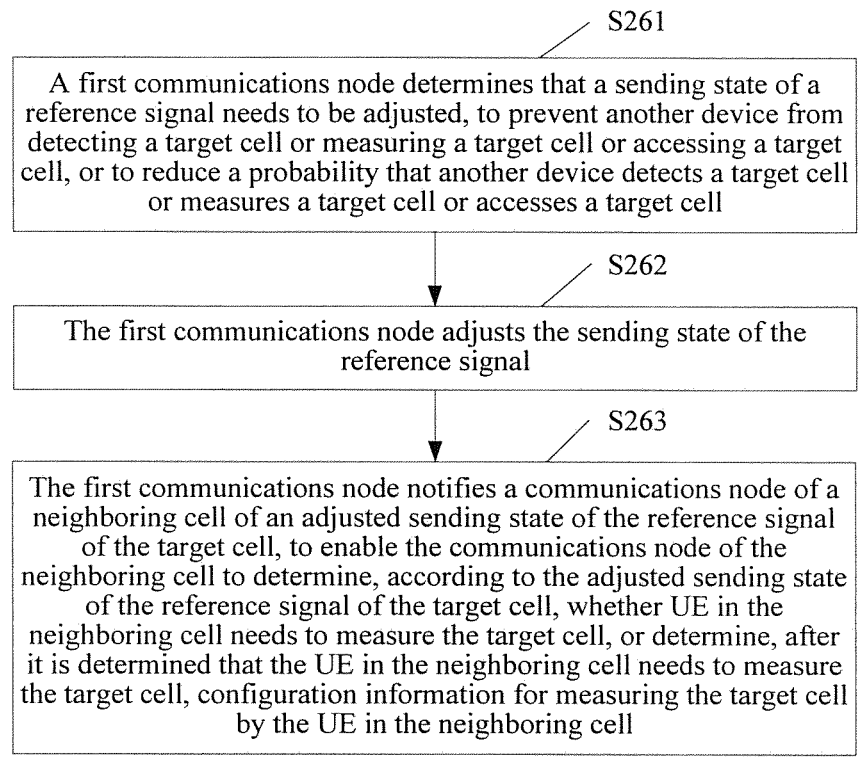
FIG. 26 is a flowchart of a signal transmission method according to Implementation Manner 4 of the present invention.

FIG. 26 is a flowchart of a signal transmission method according to Implementation Manner 4 of the present invention, where the signal transmission method includes:

S261: A first communications node determines that a sending state of a reference signal needs to be adjusted, to prevent another device from detecting a target cell or measuring the target cell or accessing the target cell, or to reduce a probability that the another device detects the target cell or measures the target cell or accesses the target cell.

S262: The first communications node adjusts the sending state of the reference signal.

S263: The first communications node notifies a communications node of a neighboring cell of an adjusted sending state of the reference signal of the target cell, to enable the communications node of the neighboring cell to determine, according to the adjusted sending state of the reference signal of the target cell, whether UE in the neighboring cell needs to measure the target cell, or determine, after it is determined that the UE in the neighboring cell needs to measure the target cell, configuration information for measuring the target cell by the UE in the neighboring cell.

By means of this implementation manner, a communications node of a neighboring cell can perform corresponding measurement adjustment according to a change of a sending state of a reference signal of a first communications node, thereby reducing unnecessary processes of measurement and signaling interactions of the communications node of the neighboring cell and UE of the neighboring cell.

Figure 27:
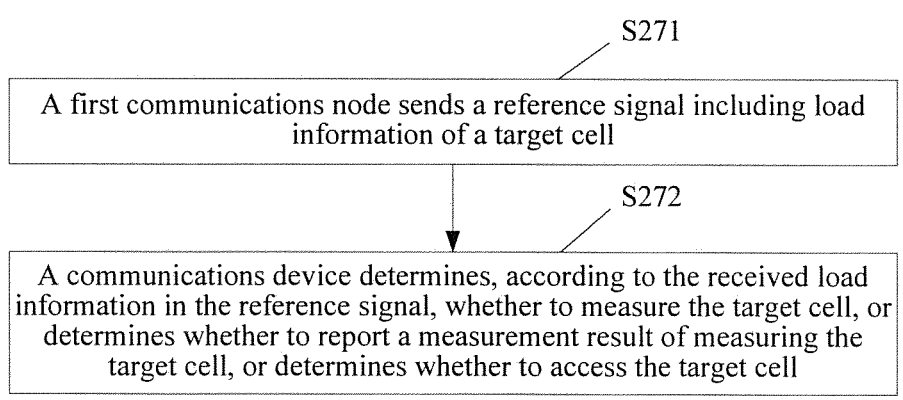
FIG. 27 is a flowchart of a signal transmission method according to Implementation Manner 5 of the present invention.

FIG. 27 is a flowchart of a signal transmission method according to Implementation Manner 5 of the present invention, where the signal transmission method includes:

S271: A first communications node sends a reference signal including load information of a target cell.

S272: A communications device determines, according to the received load information in the reference signal, whether to measure the target cell, or determines whether to report a measurement result of measuring the target cell, or determines whether to access the target cell.

In a specific implementation process, the first communications node may send the reference signal including the load information of the target cell in the following manners:

The first communications node may implicitly notify the communications device of the load information of the reference signal. That is, the load information is implicitly included in the reference signal; for example, the reference signal is sent according to a reference signal sending period corresponding to the load information, or, the first communications node occupies a bandwidth corresponding to the load information to send the reference signal. The first communications node may also add the load information to the reference signal; for example, the first communications node sends the reference signal including encoding information corresponding to the load information.

Correspondingly, the communications device determines the load information according to the reference signal sending period, or, determines the load information according to the bandwidth occupied to send the reference signal, or determines the load information according to the encoding information included in the reference signal, and determines, according to the determined load information, whether to measure the target cell, or determines whether to report the measurement result of measuring the target cell, or determines whether to access the target cell.

By means of this implementation manner, a communications device does not need to read a system broadcast message of an RRC layer to acquire load information, and can acquire, without needing to read another physical channel message, load information of a target cell at the same time when the target cell is detected, and determine, according to the load information, whether to measure the target cell, or determine, after it is determined to measure the target cell, in combination with a measurement result, whether to report the measurement result, or determine whether to access the target cell, thereby reducing some unnecessary processes of measurement and signaling interactions, and increasing efficiency of cell handover.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of a device is divided into different function modules to implement all or some of the functions described above. For a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A signal transmission method, comprising:
   determining, by a first communications node, that a sending state of a reference signal needs to be adjusted when one or more of the following cases occur in a first cell:
   a radio resource is overloaded,
   a backhaul link network is overloaded,
   a transmission delay in a backhaul link exceeds a set threshold, or
   a hardware resource is overloaded; and
   adjusting, by the first communications node, the sending state of the reference signal of the first cell to stop sending the reference signal of the first cell;
   stopping, by the first communications node, sending the reference signal of the first cell according to the adjusted sending state;
   after stopping sending the reference signal, transmitting, by the first communications node, data or control signaling to a user equipment (UE) in the first cell using a resource previously occupied by the reference signal; and
   wherein the first communications node is a pico eNodeB and the reference signal is a Discovery Reference Signal (D-RS).

2. The method according to claim 1, wherein after adjusting, by a first communications node, a sending state of a reference signal of the first cell to stop sending the reference signal of the first cell, the method further comprises:
   notifying, by the first communications node, the UE in the first cell to receive data and/or control signaling on the resource previously carrying the reference signal.

3. The method according to claim 2, wherein notifying, by the first communications node, the UE in the first cell to receive the data and/or control signaling on the resource previously carrying the reference signal comprises at least one of the following:
   notifying, by the first communications node, by using a system information block (SIB), the UE in the first cell to receive the data and/or control signaling on the resource previously carrying the reference signal;
   notifying, by the first communications node, by using dedicated radio resource control (RRC) signaling, the UE in the first cell to receive the data and/or control signaling on the resource previously carrying the reference signal;
   notifying, by the first communications node, by using a physical layer broadcast message, the UE in the first cell to receive the data and/or control signaling on the resource previously carrying the reference signal; or
   notifying, by the first communications node, by using downlink control information (DCI), the UE in the first cell to receive the data and/or control signaling on the resource previously carrying the reference signal.

4. The method according to claim 2, further comprising at least one of:
   after notifying, by the first communications node, the UE in the first cell to receive the control signaling on the resource previously carrying the reference signal, sending, by the first communications node, by using a physical layer control channel, the control signaling on the resource previously carrying the reference signal to the UE in the first cell; or
   after notifying, by the first communications node, the UE in the first cell to receive the data on the resource previously carrying the reference signal, sending, by the first communications node, by using a physical layer data channel, the data on the resource previously carrying the reference signal to the UE in the first cell.

5. The method according to claim 1, wherein after adjusting, by a first communications node, the sending state of the reference signal of the first cell to stop sending the reference signal of the first cell, the method further comprises:
   notifying, by the first communications node, a communications node of a neighboring cell of the adjusted sending state of the reference signal of the first cell, to enable the communications node of the neighboring cell to determine, according to the adjusted sending state of the reference signal of the first cell, whether UE in the neighboring cell needs to measure the first cell, and/or, determine configuration information for measuring the first cell by UE in the neighboring cell.

6. A signal transmission device, comprising:
   a processor configured to:
      determine that a sending state of a reference signal needs to be adjusted when one or more of the following cases occur in a first cell:
      a radio resource is overloaded;
      a backhaul link network is overloaded;
      a transmission delay in a backhaul link exceeds a set threshold; or
      a hardware resource is overloaded, and
      adjust the sending state of the reference signal of the first cell to stop sending the reference signal of the first cell; and
   a transmitter configured to:
      receive the sending state of the reference signal from the processor, and stop sending the reference signal of the first cell according to the adjusted sending state, and
      after stopping sending the reference signal, transmit data or control signaling to a user equipment (UE) using resources previously occupied by the reference signal; and
   wherein the signal transmission device is a pico eNodeB and the reference signal is a Discovery Reference Signal (D-RS).

7. The device according to claim 6, wherein the transmitter if further configured to notify, after the processor adjusts the sending state of the reference signal of the first cell to stop sending the reference signal of the first cell, the UE in the first cell to receive data and/or control signaling on the resource previously carrying the reference signal.

8. The device according to claim 7, wherein the transmitter is further configured to notify the UE in the first cell to receive the data and/or the control signaling on the resource previously carrying the reference signal according to at least one of the following manners:
   notify, by using a system information block (SIB), the UE in the first cell to receive the data and/or control signaling on the resource previously carrying the reference signal;
   notify, by using dedicated radio resource control (RRC) signaling, the UE in the first cell to receive the data and/or control signaling on the resource previously carrying the reference signal;

notify, by using a physical layer broadcast message, the UE in the first cell to receive the data and/or control signaling on the resource previously carrying the reference signal; or notify, by using downlink control information (DCI), the UE in the first cell to receive the data and/or control signaling on the resource previously carrying the reference signal.

9. The method according to claim 7, wherein the transmitter is further configured to:
after the UE in the first cell is notified to receive the control signaling on the resource previously carrying the reference signal, send, by using a physical layer control channel, the control signaling on the resource previously carrying the reference signal to the UE in the first cell; or
after the UE in the first cell is notified to receive the data on the resource previously carrying the reference signal, send, by using a physical layer data channel, the data on the resource previously carrying the reference signal to the UE in the first cell.

10. The method according to claim 6, wherein the transmitter if further configured to:
after the processor adjusts the sending state of the reference signal of the first cell to stop sending the reference signal of the first cell, notify a communications node of a neighboring cell of the adjusted sending state of the reference signal of the first cell, to enable the communications node of the neighboring cell to determine, according to the adjusted sending state of the reference signal of the first cell, whether UE in the neighboring cell needs to measure the first cell, and/or, determine configuration information for measuring the first cell by UE in the neighboring cell.

11. A signal transmission method, comprising:
sending, by a first base station, a reference signal according to a first sending state of the reference signal to a second base station;
receiving, by the first base station, a bearer request from the second base station in response to receipt by the second base station of the reference signal according to the first sending state;
adjusting, by the first base station, the sending state of the reference signal from the first sending state to a second sending state;
sending, by the first base station, the reference signal according to the second sending state to the second base station;
receiving, by the first base station, in response to receipt by the second base station of the reference signal according to the second sending state, no bearer requests from the second base station while the first base station is in the second sending state.

12. The method according to claim 11, wherein:
adjusting, by the first base station, the sending state of the reference signal from the first sending state to the second sending state comprises: the first base station adjusts the sending state of the reference signal to stop sending the reference signal; and
sending, by the first base station, the reference signal according to the second sending state to the second base station comprises: the first base station stops sending the reference signal to the second base station.

13. The method according to claim 11, wherein:
adjusting, by the first base station, the sending state of the reference signal from the first sending state to the second sending state comprises: the first base station extends a sending period of the reference signal; and
sending, by the first base station, the reference signal according to the second sending state to the second base station comprises: the first base station sends the reference signal to the second base station using the extended sending period.

14. The method according to claim 11, wherein:
adjusting, by the first base station, the sending state of the reference signal from the first sending state to the second sending state comprises: the first base station lowers a bandwidth occupied when the reference signal is sent; and
sending, by the first base station, the reference signal according to the second sending state to the second base station comprises: the first base station sends the reference signal to the second base station by using the lower bandwidth.

15. The method according to claim 11, wherein before adjusting, by the first base station, the sending state of the reference signal from the first sending state to the second sending state, the method further comprises:
determining, by the first base station, when one or more of the following cases occur in the first base station, that the sending state of the reference signal needs to be adjusted:
a radio resource is overloaded;
a backhaul link network is overloaded;
a transmission delay in a backhaul link exceeds a set threshold; or
a hardware resource is overloaded.

16. The method according to claim 11, wherein after receiving, by the first base station, a bearer request from the second base station in response to receipt by the second base station of the reference signal according to the first sending state, the method further comprises at least one of:
receiving, by the first base station, uplink data transmitted by the second base station, and transmitting, by the first base station, the uplink data received from the second base station to a core network by using a backhaul network resource of the first base station; or
receiving, by the first base station, downlink data transmitted by the core network and, transmitting, by the first base station, the downlink data received from the core network to the second base station by using an air interface between the first base station and the second base station.

17. A base station transmission device, comprising:
a processor configured to adjust a sending state of a reference signal of a base station to a first sending state; and
a transmitter configured to send, in response to receiving the first sending state from the processor, a reference signal of the first base station to a second base station according to the first sending state; and
wherein the processor is further configured to:
receive a bearer request from the second base station sent in response to receipt by the second base station of the reference signal sent by the first base station according to the first sending state, and
adjust the sending state of the reference signal from the first sending state to a second sending state and send the second sending state to the transmitter; and
wherein the transmitter is further configured to send, in response to receiving the second sending state from the processor, the reference signal to the second base station according to the second sending state; and wherein the processor is further configured to receive no bearer requests from the second base station while the first base station is in the second sending state.

18. The device according to claim 17, wherein:
the processor is further configured to adjust the sending state of the reference signal from the first sending state to a second sending state comprises: the processor is configured to adjust the second sending state to stop sending the reference signal; and
the transmitter is father configured to send the reference signal to the second base station according to the second sending state comprises: the transmitter is configured to stop sending the reference signal to the second base station.

19. The device according to claim 17, wherein:
the processor is further configured to adjust the sending state of the reference signal from the first sending state to a second sending state comprises: the processor is configured to extend a sending period of the reference signal; and
the transmitter is further configured to send the reference signal to the second base station according to the second sending state comprises: the transmitter is configured to send the reference signal to the second base station using the extended sending period.

20. The device according to claim 17, wherein:
the processor is further configured to adjust the sending state of the reference signal from the first sending state to a second sending state comprises: the processor is configured to lower a bandwidth occupied when the reference signal is sent; and
the transmitter is further configured to send the reference signal to the second base station according to the second sending state comprises: the transmitter is configured to send the reference signal to the second base station by using the lower bandwidth.

21. The device according to claim 17, wherein the processor is further configured to determine, before adjusting the sending state of the reference signal from the first sending state to the second sending state, that the sending state of the reference signal needs to be adjusted when one or more of the following cases occur in the first base station:
a radio resource is overloaded;
a backhaul link network is overloaded;
a transmission delay in a backhaul link exceeds a set threshold; or
a hardware resource is overloaded.

22. The device according to claim 17, further comprising wherein:
the first base station is configured to receive, after the processor receives a bearer request from the second base station in response to receipt by the second base station of the reference signal according to the first sending state, uplink data transmitted by the second base station, and the transmitter is further configured to transmit the uplink data received from the second base station to a core network by using a backhaul network resource of the first base station; or
the first base station is configured to receive, after the processor receives the bearer request from the second base station in response to receipt by the second base station of the reference signal according to the first sending state, downlink data transmitted by the core network and, the transmitter is further configured to transmit, by the first base station, the downlink data received from the core network to the second base station by using an air interface between the first base station and the second base station.

\* \* \* \* \*